US012811439B2

(12) United States Patent
Baker et al.

(10) Patent No.: US 12,811,439 B2
(45) Date of Patent: Nov. 24, 2026

(54) ELECTRONIC DEVICE CASE FOR USE WITH A WIRELESS POWER TRANSFER SYSTEM

(71) Applicant: ETHERDYNE TECHNOLOGIES, INC., Daly City, CA (US)

(72) Inventors: Jon P. Baker, Minneapolis, MN (US); Robert A. Moffatt, Palo Alto, CA (US); Jeffrey J. Yen, Palo Alto, CA (US)

(73) Assignee: ETHERDYNE TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/001,535

(22) PCT Filed: Jun. 10, 2021

(86) PCT No.: PCT/US2021/036823
§ 371 (c)(1),
(2) Date: Dec. 12, 2022

(87) PCT Pub. No.: WO2021/252771
PCT Pub. Date: Dec. 16, 2021

(65) Prior Publication Data

US 2023/0283116 A1 Sep. 7, 2023

Related U.S. Application Data

(60) Provisional application No. 63/145,001, filed on Feb. 3, 2021, provisional application No. 63/037,666, filed on Jun. 11, 2020.

(51) Int. Cl.
*H02J 50/40* (2016.01)
*H02J 50/00* (2016.01)
*H02J 50/20* (2016.01)

(52) U.S. Cl.
CPC ............ *H02J 50/40* (2016.02); *H02J 50/005* (2020.01); *H02J 50/20* (2016.02)

(58) Field of Classification Search
None
See application file for complete search history.

(56) References Cited

U.S. PATENT DOCUMENTS 9,509,147 B2 11/2016 Karalis et al.
10,044,230 B2 8/2018 Moffatt et al.
(Continued)

FOREIGN PATENT DOCUMENTS

KR 20170137569 A 12/2017
TW 201843908 A 12/2018
WO 2008118178 A1 10/2008

OTHER PUBLICATIONS

International Search Report for International Application No. PCT/US2021/036823 mailed Dec. 16, 2021.
(Continued)

*Primary Examiner* — Regis J Betsch
*Assistant Examiner* — Joel Barnett
(74) *Attorney, Agent, or Firm* — Perilla Knox & Hildebrandt LLP; Kenneth A. Knox

(57) ABSTRACT

An accessory for charging or powering an electronic device is described. The accessory may include a wireless power receiver configured to receive power while the case is positioned in a first wireless power transfer area. The accessory may further include a wireless power transmitter electrically coupled to the wireless power receiver. The wireless power transmitter is configured to power the electronic device through a second wireless power transfer area, which may be smaller than the first wireless power transfer area. The wireless power transmitter may include a QI standard-compliant wireless power transmitter.

18 Claims, 22 Drawing Sheets

(56) References Cited

U.S. PATENT DOCUMENTS

| | | | | |
|---|---|---|---|---|
| 10,250,078 | B2 | 4/2019 | Moffatt et al. | |
| 10,523,059 | B2 | 12/2019 | Moffatt et al. | |
| 10,892,649 | B2 | 1/2021 | Moffatt | |
| 10,931,149 | B2 | 2/2021 | Moffatt et al. | |
| 10,950,383 | B2 | 3/2021 | Moffatt | |
| 10,957,480 | B2 | 3/2021 | Moffatt | |
| 11,133,715 | B2 | 9/2021 | Moffatt et al. | |
| 11,362,543 | B2 | 6/2022 | Moffatt et al. | |
| 11,482,883 | B2 | 10/2022 | Moffatt | |
| 11,569,690 | B2 | 1/2023 | Moffatt | |
| 11,685,270 | B2 | 6/2023 | Karalis et al. | |
| 2010/0117456 | A1 | 5/2010 | Karalis et al. | |
| 2014/0035511 | A1* | 2/2014 | Ferber | H02J 7/0042 320/103 |
| 2014/0246917 | A1* | 9/2014 | Proud | A61B 5/14551 307/104 |
| 2014/0327320 | A1* | 11/2014 | Muhs | H04B 5/79 307/104 |
| 2016/0105047 | A1* | 4/2016 | Cui | H02J 7/0044 320/115 |
| 2017/0373518 | A1 | 12/2017 | Hadnett | |
| 2018/0069358 | A1 | 3/2018 | Miller et al. | |
| 2019/0363590 | A1* | 11/2019 | Jakubowski | H02J 50/005 |
| 2020/0067350 | A1* | 2/2020 | Moffatt | H02J 50/70 |
| 2020/0083754 | A1 | 3/2020 | Tian et al. | |
| 2020/0144837 | A1 | 5/2020 | To et al. | |
| 2020/0153279 | A1 | 5/2020 | Lee et al. | |

OTHER PUBLICATIONS

Written Opinion for International Application No. PCT/US2021/036823 mailed Dec. 16, 2021.

First Office Action for Taiwan Patent Application No. 110121122 mailed Jun. 16, 2022.

Extended European Search Report for EP Patent Application No. 21821141.5.

* cited by examiner

Quality Factor of a Circular Loop as a Function of Radius

Radiation Resistance of a Circular Loop as a Function of Radius

ELECTRONIC DEVICE CASE FOR USE WITH A WIRELESS POWER TRANSFER SYSTEM

CROSS-REFERENCE TO RELATED APPLICATIONS

This application is a national phase under 35 U.S.C. 371 of International Application No. PCT/US2021/036823 filed Jun. 10, 2021, which claims the benefit of and priority to U.S. Provisional Patent Application No. 63/037,666 filed Jun. 11, 2020, entitled "ELECTRONIC DEVICE CASE FOR USE WITH A WIRELESS POWER TRANSFER SYSTEM," and U.S. Provisional Patent Application No. 63/145,001 filed Feb. 3, 2021, entitled "ELECTRONIC DEVICE CASE FOR USE WITH A WIRELESS POWER TRANSFER SYSTEM," the contents of which being incorporated by reference in their entireties herein.

BACKGROUND

Wireless power transfer is the transmission of electrical energy from a power source to an electrical load without the use of man-made conductors to connect the power source to the electrical load. A wireless power transfer system consists of a transmitter and one or more receiver devices. The transmitter is connected to a source of power and converts the power to a time-varying electromagnetic field. The one or more receiver devices receive the power via the electromagnetic field and converts the received power back to an electric current to be utilized by the electrical load.

The Wireless Power Consortium adopted the QI standard, which is a widely-used interface that defines wireless power transfer using inductive charging over a short distance. Typically, the QI standard is only able to accomplish wireless charging of devices from 4 cm or less. Generally, the QI standard relies on a charging pad and a compatible electronic device for placement on top of the pad, which causes charging of a battery of the compatible electronic device through resonant inductive coupling.

Korean Patent Application No. 20170137569 describes a mobile phone case which includes a charging module which is arranged on the case so as to be wirelessly charged while being transmitted to a portable terminal by a magnetic resonance method generated from a power supplied from the outside, when the portable terminal is mounted on the case on which the portable terminal is detachably mounted; and a lens which improves the camera magnification and the light. However, the mobile phone case, like other devices that utilize the QI standard, is limited in range, requiring the mobile phone case to be in close proximity (e.g., less than 4 cm) to a charging station.

BRIEF SUMMARY OF INVENTION

Various embodiments for an accessory, such as a protective case, for use with an electronic device are described, where the accessory is configured to receive wireless power from a first wireless power transfer area and transmit power to the electronic device using a second wireless power transfer area. The accessory for the electronic device may include a wireless power receiver and a wireless power transmitter. The wireless power receiver may be configured to receive power while the case for the electronic device is in a first wireless power transfer area. The wireless power transmitter may be configured to power the electronic device through a second wireless power transfer area being smaller than the first wireless power transfer area.

The wireless power transmitter positioned within the housing may include a first wireless power transmitter. The wireless power receiver may be configured to receive power from a second wireless power transmitter external to the case, where the second wireless power transmitter is powered by a radiofrequency (RF) power source to transmit power across a large wireless power transfer area. The first wireless power transmitter may include a QI standard-compliant wireless power transmitter. The electronic device may be one of: a mobile phone; a laptop computing device; a tablet computing device; a smart watch computing device, a lighting device, and a sensor.

The accessory may further include a housing configured to detachably attach to the electronic device through at least one of: an interference fit; a friction fit; a connection fit, and/or an adhesive connection. The wireless power receiver and the wireless power transmitter may be disposed between a first surface of the housing and a second surface of the housing. The case may further include processing circuitry configured to convert the power received wirelessly by the wireless power receiver from an alternating current (AC) signal to a direct current (DC) signal and provide the wireless power transmitter with the DC signal.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
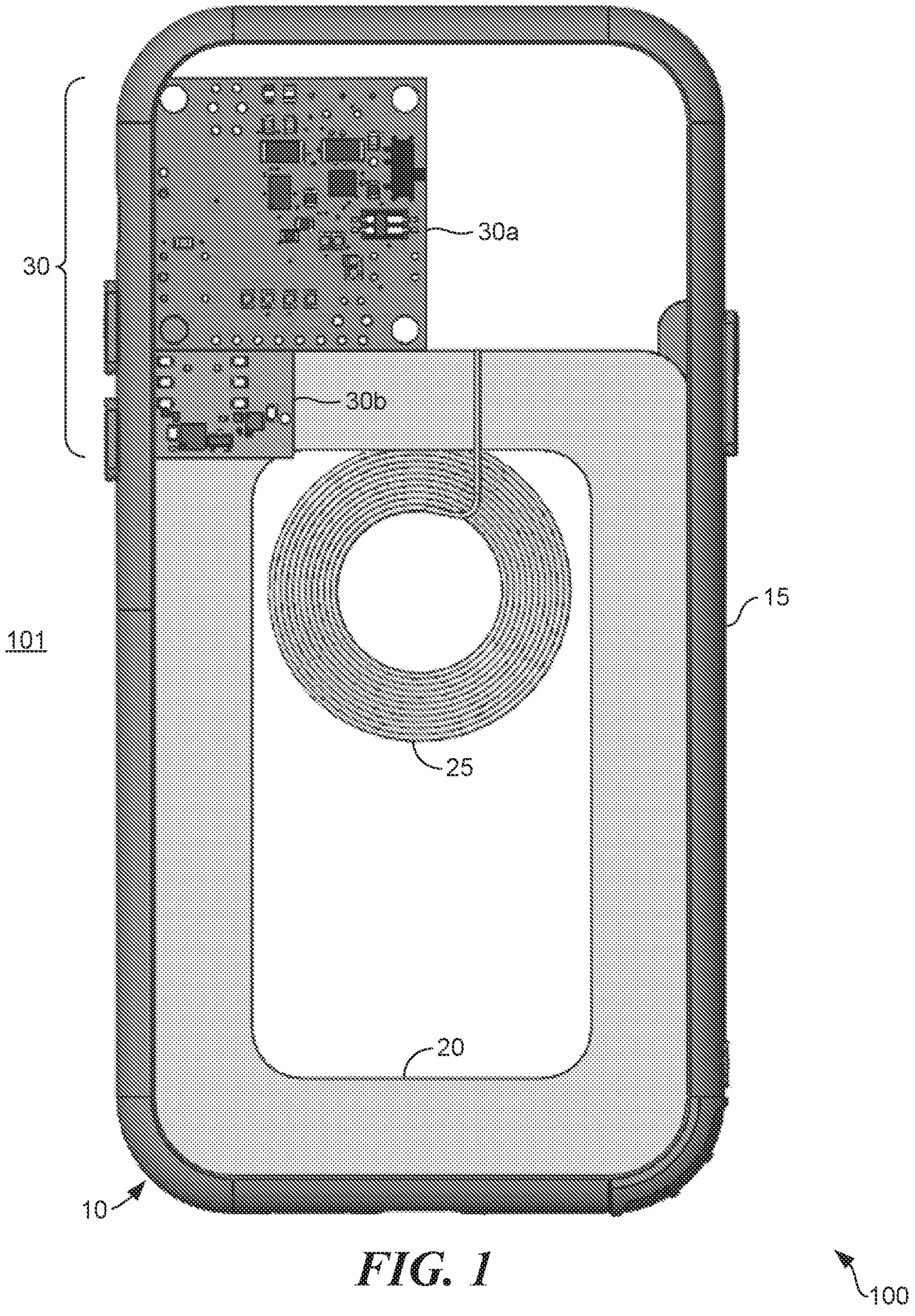
FIG. 1 shows a schematic diagram of an example wireless power transfer system having an accessory for use with an electronic device that includes a wireless power receiver and a wireless power transmitter in accordance with one or more embodiments of the disclosure.

The present disclosure relates to a case for use with a wireless power transfer system. Various types of smartphones and other electronic devices include wireless power receivers that allow the respective electronic device to be powered wirelessly. For instance, today, the QI standard is the predominant wireless charging standard. As such, various smartphones include QI standard-compliant wireless power receivers. To charge these smartphones, as well as other types of electronic devices, a smartphone must be positioned on a charging surface, thereby forming a physical connection with the charging surface. For instance, a QI standard-compliant wireless power receiver in the smartphone must be positioned within 5 cm of the QI standard-compliant wireless power transmitter.

However, large wireless power transfer areas are available, such as those disclosed in U.S. Pat. No. 10,250,078 assigned to Etherdyne Technologies, Inc. However, due to the design of the wireless power receivers in existing electronic devices, the electronic devices are not able to receive power from the large wireless power transfer areas, and must be charged by placing the electronic devices on a charging station. It is also not feasible to replace or modify existing wireless power receivers in existing electronic devices such that they are able to receive power wirelessly in these larger wireless power transfer areas.

Accordingly, various embodiments are described herein for a case or other attachment to an electronic device that is configured to receive wireless power from a large wireless power transfer area and transmit power to the electronic device using a second wireless power transfer area (e.g., a QI standard-compliant wireless power transfer area). In various embodiments, a case, adaptor, or other accessory for an electronic device may include a wireless power receiver and a wireless power transmitter. The wireless power receiver may be configured to receive power while the case and/or the electronic device is in a first wireless power transfer area, for instance, when the case and/or the electronic device are feet away from a transmitter. The wireless power transmitter may be configured to power the electronic device through a second wireless power transfer area, as will be described.

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the present disclosure. However, it will be apparent to one of ordinary skill in the art that the embodiments may be practiced without these specific details. In other instances, well-known features have not been described in detail to avoid unnecessarily complicating the description.

In the following description, any component described with regard to a figure, in various embodiments of the disclosure, may be equivalent to one or more similarly named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Turning now to FIG. 1, an example schematic diagram of a wireless power transfer system 100 is shown in accordance with various embodiments of the present disclosure. The wireless power transfer system 100 may include or be used in association with a large-area wireless power transmitter (not shown) as will be described with respect to FIGS. 2A-2C, among others. As may be appreciated, the wireless power transmitter may provide power within a wireless power transfer area 101, as shown in FIG. 3A and FIG. 3B.

Referring to FIG. 1, the wireless power transfer system 100 may include an accessory, such as an accessory 10 for an electronic device (not shown) that may attach to or otherwise couple to an electronic device. While various embodiments are described herein with respect to the accessory 10 being a case for an electronic device (e.g., a phone case), in other embodiments, the accessory may include an electronic device mount, charging station, attachment, and so forth. The electronic device may include, for example, a mobile phone (e.g., a smartphone), a laptop computing device, a tablet computing device, a smart watch computing device, a lighting device, a sensor, an augmented reality device, a virtual reality device, and so forth. As such, the accessory 10 may include a case for an electronic device comprising a housing 15 configured to detachably attach to the electronic device through at least one of an interference fit, a friction fit, a connection fit, a magnetic connection, an adhesive connection, any combination thereof, etc.

The accessory 10 may include a wireless power receiver 20 (also referred to herein as a receiver device), a wireless power transmitter 25, and processing circuitry 30. For instance, the housing 15 may include a first surface (not shown) and a second surface (not shown), where the wireless power receiver 20, the wireless power transmitter 25, and the processing circuitry 30 are disposed, at least partially, between the first surface and the second surface.

The wireless power receiver 20 may be configured to receive power while the accessory 10 and/or the connected electronic device is located in a wireless power transfer area 101. For instance, the accessory 10 and/or the connected electronic device may act as one of the receivers denoted A through F in FIG. 3A and FIG. 3B. To this end, the wireless power receiver 20 is configured to receive power from a wireless power transmitter (not shown), specifically one that is external to the accessory 10. For instance, the wireless power receiver 20 is configured to receive power from a transmitter connected to an RF power source that transmits power across a large wireless power transfer area 101.

The wireless power transmitter 25 may be electrically coupled to the wireless power receiver 20 through a direct or indirect connection (e.g., through the processing circuitry 30). The wireless power transmitter 25 may be configured to power an electronic device through a wireless power transfer area separate from the large-area type of wireless power transfer area 101. For instance, the wireless power transmitter 25 may be a QI standard-compliant wireless power transmitter. As many types of electronic devices include a QI standard-compliant wireless power receiver, the accessory 10 may receive power from a larger wireless power transfer area (e.g., wireless power transfer area 101) and transfer the power to the electronic device via the wireless power transmitter 25 of the accessory 10. As such, it is not necessary for the electronic device to alter receiver circuitry of the electronic device to receive power in the wireless power transfer area 101.

In some embodiments, the wireless power transmitter 25 ultimately powers the electronic device directly, or charges at least one battery of the electronic device, such as one that powers a portable electronic device.

The processing circuitry 30 may be configured to filter any power signals received by the wireless power receiver 20. For instance, the processing circuitry 30 may include signal smoothing circuitry, as may be appreciated. Further, the processing circuitry 30 may be configured, for example, to convert power received wirelessly by the wireless power receiver 20 from an alternating current (AC) signal to a direct current (DC) signal and provide the wireless power transmitter 25 with the DC signal, if needed. In some embodiments, the processing circuitry 30 may include a first circuit 30*a* and a second circuit 30*b*, although in some embodiments, the first circuit 30*a* and the second circuit 30*b* may be integrated on a single chip, circuit board, or otherwise integrated into a single circuit. In one example, the first circuit 30*a* may include a circuit of the wireless power receiver 20, while the second circuit 30*b* may include a circuit coupled to the wireless power transmitter 25.

As will be described in greater detail below, the wireless power receiver 20 may include a receiving coil, as shown in FIG. 1. For example, the receiving coil may be formed of a conductive material and form a single circular-, square-, or rectangular-shaped loop, as shown in FIG. 1. In other examples, the receiving coil circuit may include a diode string formed by an outer wire, an inner wire, and a plurality of diodes, each of the plurality of diodes having a first end coupled to the outer wire and a second end coupled to the inner wire such that each of the diodes are connected in parallel with one another. The diode string may form a loop. Further, a rectifier circuit may be coupled to ends of the diode string. The rectifier circuit may include one or more capacitors, where at least one of the capacitors is configured to bring the diode string into resonance with the oscillating magnetic field and enhance an induced oscillating voltage. Rectifying diodes may rectify the induced oscillating voltage to produce a DC voltage difference between the outer wire and the inner wire of the diode string, thereby powering the diodes connected in parallel.

In further embodiments, the wireless power receiver 20 may include a receiving coil circuit or other receiving circuit as described herein with respect to FIGS. 7A-7E. While shown separate from the processing circuitry 30, in some embodiments, the wireless power receiver 20 and/or the wireless power transmitter 25 of the accessory 10 may be disposed on the same substrate as the processing circuitry or otherwise provided in an integrated circuit (IC). In some embodiments, the accessory 10 includes a ferrite substrate or other material having similar properties that optimize receipt of power from the wireless power transfer area 101 and transmission of power to an electronic device.

In various embodiments, the accessory, such as the accessory 10, may include a battery (not shown) which is separate from a battery of the electronic device being powered in instances in which the electronic device includes a battery. To this end, the battery may be used to charge the electronic device or otherwise power the electronic device, for instance, through a wired power connection (e.g., using USB, USB-C, or similar type of connection). Alternatively, power received by the wireless power receiver 20 may be stored in the battery of the accessory 10, and the power stored in the battery may be used to transmit power to the electronic device through the wireless power transmitter 25, such as a QI transmitter.

In further embodiments, the accessory 10 may include one or more magnets (not shown) or magnetic devices. Each of the one or more magnets may include, for example, a paramagnetic or a ferromagnetic magnet that causes the accessory 10 to form a magnetic coupling with a device to be enclosed in the accessory 10 and/or an external charging device, such as an external QI charging device. For instance, a magnet of the accessory 10 may magnetically couple to a magnet disposed in a smartphone or tablet. In another example, a magnet of the accessory 10 may magnetically couple to an external QI charging device or a device mount, such as a vehicle-based phone mount.

Figure 2:
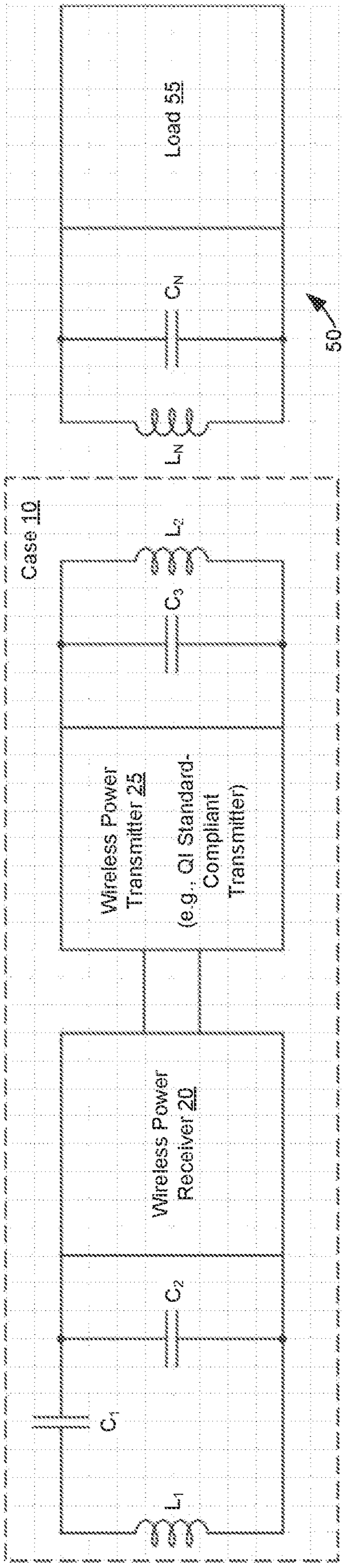
FIG. 2 shows a circuit diagram of the example wireless power transfer system of FIG. 1 in accordance with one or more embodiments of the disclosure.
Figure 3A:
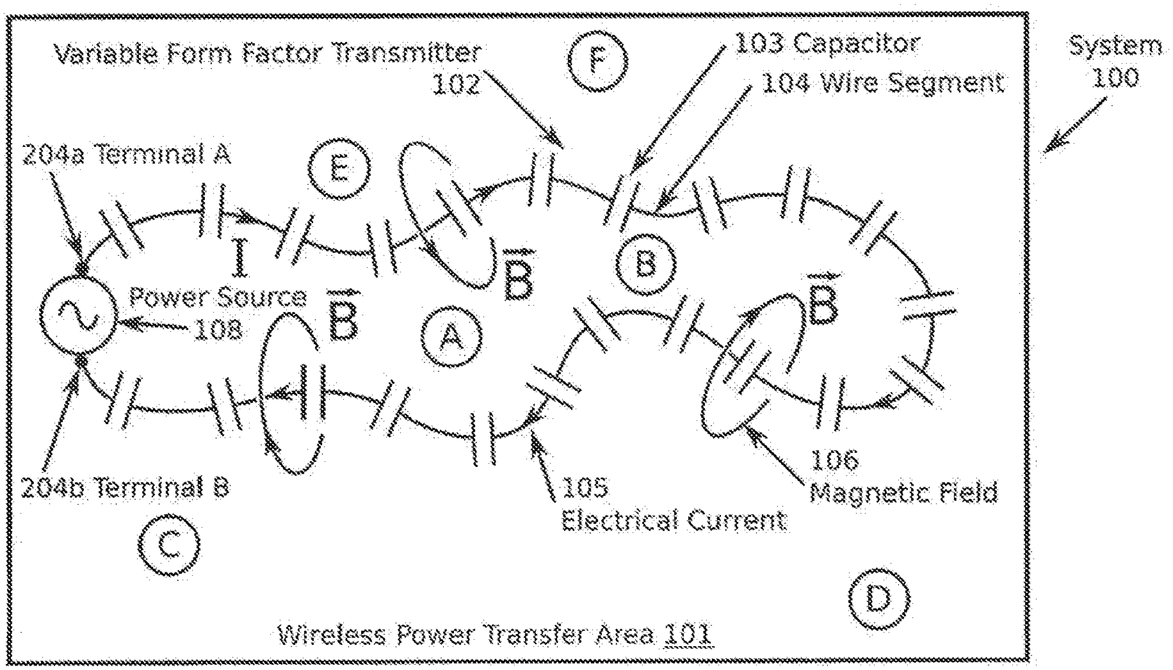
FIGS. 3A, 3B, and 3C show schematic diagrams of an example wireless power transfer system having a variable form factor transmitter in accordance with one or more embodiments of the disclosure.
Figure 3B:
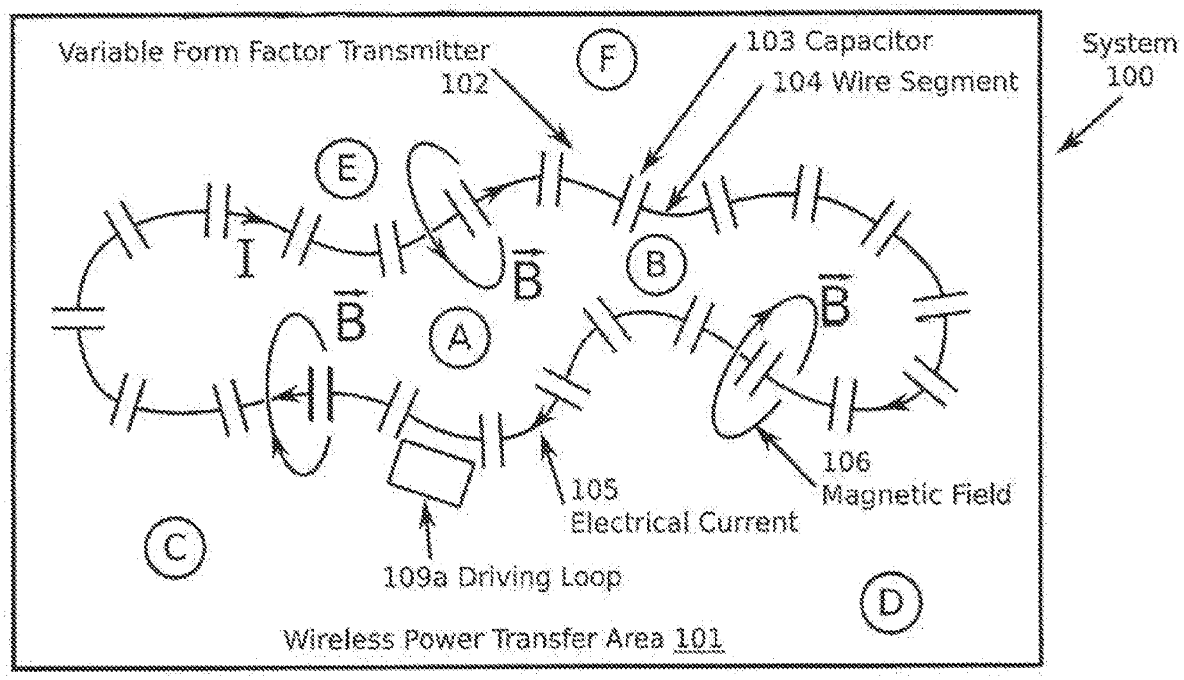

Turning now to FIG. 2, an example of a circuit diagram is shown. The circuit diagram includes an accessory 10 for use with an electronic device 50. The electronic device 50 may include a circuit, a battery, and/or other load 55. For instance, the electronic device 50 may include, for example, a mobile phone (e.g., a smartphone), a laptop computing device, a tablet computing device, a smart watch computing device, a lighting device, a sensor, and so forth. The circuit diagram may include a plurality of inductors $L_1 \ldots L_n$, capacitors $C_1 \ldots C_N$, and so forth.

In embodiments in which the electronic device 50 is a sensor, the sensor may not include a battery as may be appreciated, but may include circuitry or other load 55. As such, the electronic device 50 may include a portable or non-portable electronic device 50 that does not comprise a battery, where the wireless power transmitter provides power directly to processing circuitry of the electronic device 50.

Similar to the embodiment described above in FIG. 1, the accessory 10 may include the wireless power receiver 20 and the wireless power transmitter 25. The wireless power receiver 20 may be configured to receive power while the accessory 10 and/or the electronic device 50 is located in a wireless power transfer area 101. To this end, the wireless power receiver 20 is configured to receive power from a wireless power transmitter (not shown), specifically one that is external to the accessory 10. For instance, the wireless power receiver 20 is configured to receive power from a transmitter connected to an RF power source that transmits power across a large wireless power transfer area 101.

FIG. 3A shows a schematic diagram of the wireless power transfer system 100 in accordance with one or more embodiments. In one or more embodiments, one or more of the modules and elements shown in FIG. 3A may be omitted, repeated, and/or substituted. Accordingly, embodiments of the disclosure should not be considered limited to the specific arrangements of modules shown in FIG. 3A.

As shown in FIG. 3A, the wireless power transfer system 100 may include a variable form factor transmitter 102 receiving power from an RF power source 108 for wireless power transfer across a wireless power transfer area 101 having one or more receiver devices (e.g., denoted as circular icons labeled as A, B, C, D, E, and F) disposed therein. Each of these components is described in detail below.

In one or more embodiments of the disclosure, the wireless power transfer area 101 is any three dimensional (3D) physical space where the one or more receiver devices are receiving power from the variable form factor transmitter 102. For example, the wireless power transfer area 101 may include a 3D space within a building or a vehicle, such as a room, a hallway, a passenger cabin of a car, bus, train, airplane, or spaceship, or any portion of the building or vehicle. In another example, the wireless power transfer area 101 may include a 3D space that is not enclosed, such as a playground, a roadway, an amusement park, or any type of field on the ground, above the ground, or away from the earth in the space (e.g., an atmospheric layer or interstellar space). In yet another example, the wireless power transfer area 101 may include an underground or under-water space, such as a cave, an underwater region near an ocean platform or seabed, etc. In another example, the wireless power transfer area 101 may include a combination of the examples above.

In one or more embodiments of the disclosure, the variable form factor transmitter 102 is disposed entirely within the wireless power transfer area 101, overlaps the wireless power transfer area 101, or in the vicinity of the wireless power transfer area 101. In one or more embodiments, at least a portion of the variable form factor transmitter 102 may be inserted in a protective sleeve, embedded in a material sheet, free-standing in the wireless power transfer area 101, or attached to the wireless power transfer area 101. In one or more embodiments, at least a portion of the variable form factor transmitter 102 may be stationary or moving with respect to the wireless power transfer area 101 and/or the one or more receiver devices (e.g., denoted as circular icons labeled as A, B, C, D, E, and F) disposed therein. In one or more embodiments of the disclosure, the form factor of the variable form factor transmitter 102 is adapted according to a geometric constraint imposed by the wireless power transfer area 101. For example, the variable form factor transmitter 102 may be made of pliable material such that the form factor of the variable form factor transmitter 102 is changed by the user to fit the physical shape of the room, hallway, passenger cabin, playground, roadway, amusement park, field, cave, under-water region, etc. of the wireless power transfer area 101. In this context, the form factor of the variable form factor transmitter 102 is based on the wireless power transfer area 101. For example, the form factor of the variable form factor transmitter 102 may include a 3D portion, such as a curved surface, a helical curve, etc.

In one or more embodiments of the disclosure, the receiver devices (A) through (F) may be of the same type or of different types that are used by one or more users, such as individual persons. In one or more embodiments, one or more of the receiver devices (A) through (F) are disposed at user specified locations throughout the wireless power transfer area 101 and are stationary during the wireless power transfer. In one or more embodiments, one or more of the receiver devices (A) through (F) have dimensions that are smaller than the dimensions of the wireless power transfer area 101. In one or more embodiments, one or more of the receiver devices (A) through (F) have dimensions that are comparable to or greater than the dimensions of the wireless power transfer area 101. For example, the receiver device (A) may be a lighting device placed on the ceiling of a room or hallway by the user. In one or more embodiments, one or more of the receiver devices (A) through (F) are carried by respective users who move around throughout the wireless power transfer area 101 from time to time during the wireless power transfer.

Based on the nature of the near electromagnetic field of the variable form factor transmitter 102, the power of the near electromagnetic field that is not received by any of the receiver device is returned to the variable form factor transmitter 102 and the RF power source 108. This is in contrast to a far electromagnetic field via which power is radiated, resulting in energy loss that is not productive for the wireless power transfer. Examples of the receiver device (A), receiver device (B), receiver device (C), receiver device (D), receiver device (E), and receiver device (F) are described in reference to FIGS. 7A, 7B, 7C, 7D, and 7E below.

In one or more embodiments of the disclosure, the variable form factor transmitter 102 includes a string of distributed capacitors. In particular, the string of distributed capacitors includes multiple capacitor-wire segments that are connected in series to conduct radio-frequency (RF) electrical current 105 generated by the power source 108. The RF electrical current 105 induces magnetic fields (e.g., magnetic field 106) that are present throughout the wireless power transfer area 101. In one or more embodiments, the string of distributed capacitors is disposed along a path such that the magnetic fields throughout the wireless power transfer area 101 exceeds a threshold that is based on a power requirement of the receiver devices. In this context, the path is based on the wireless power transfer area 101. In one or more embodiments, the RF electrical current 105 enters/exits the wire at a terminal A 204*a* and a terminal B 204*b*. In one or more embodiments, additional intervening components (not shown) may also be inserted in the series of capacitor-wire segments or inserted between the series of capacitor-wire segments and one or more terminals (e.g., terminal A 204*a*, terminal B 204*b*) without impeding the operation of the variable form factor transmitter 102.

In one or more embodiments, each capacitor-wire segment includes a capacitor (e.g., capacitor 103) connected to a wire segment (e.g., wire segment 104). In one or more embodiments, each capacitor (e.g., capacitor 103) in the variable form factor transmitter 102 has the same nominal capacitance value, as any other capacitor therein, that is determined prior to disposing the variable form factor transmitter 102 in the wireless power transfer area 101. For example, the capacitors (e.g., capacitor 103) in the variable form factor transmitter 102 may be installed in a factory before a user uses the variable form factor transmitter 102 to provide power wirelessly within the wireless power transfer area 101. The capacitors (e.g., capacitor 103) may be of a suitable type, such as ceramic capacitors, film and paper capacitors, electrolyte capacitors, polymer capacitors, silver mica capacitors, etc. In one or more embodiments, one or more of the capacitors may include two aluminum or other metallic sheets, foils, or films separated by an aluminum or other metallic oxide layer. As is typical in a factory manufacturing process, the capacitance values of all capacitors (e.g., capacitor 103) in the variable form factor transmitter 102 may vary within a range (referred to as a capacitance range), e.g., due to a manufacturing tolerance.

In one or more embodiments, each capacitor-wire segment includes a wire segment having a predetermined segment length and a predetermined inductance per unit length. For example, the wire segments (e.g., wire segment 104) in the variable form factor transmitter 102 may be installed in a factory before a user uses the variable form factor transmitter 102 to provide power wirelessly within the wireless power transfer area 101. The wire segments (e.g., wire segment 104) may be of a suitable type, such as insulated or un-insulated wires, sheets, foil, or films made of copper, aluminum, or other suitable metal and/or alloy material. In one or more embodiments, one or more of the wire segments (e.g., wire segment 104) are flexible or pliable such that the user may bend, stretch, or otherwise change the shape of the one or more wire segments. As is typical in a factory manufacturing process, the length and inductance values of each and all wire segments (e.g., wire segment 104) in the variable form factor transmitter 102 may vary within a range (referred to as a length range and an inductance range), e.g., due to a manufacturing tolerance.

In one or more embodiments of the disclosure, by confining the electrical fields, the capacitors (e.g., capacitor 103) in the variable form factor transmitter 102 reduce stray electric fields and the resultant induced voltage of the wire segments (e.g., wire segment 104). Accordingly, the capacitors (e.g., capacitor 103) in the variable form factor transmitter 102 reduce the fraction of energy stored in the stray capacitance of the wire segments (e.g., wire segment 104) over the total energy in the wireless power transfer system 100. The reduction of both induced voltage and stored energy associated with the stray capacitance reduces loss due to environmental interactions and improves safety for the user.

In one or more embodiments of the disclosure, the variable form factor transmitter 102 is associated with a characteristic frequency that is based at least on the pre-determined capacitance, the predetermined segment length, and the predetermined inductance per unit length. The characteristic frequency of the variable form factor transmitter 102 is described in reference to FIGS. 4A, 4B, 4D, 4E, 5A, 5B, 5C, 5D, and 5E below. Throughout this document, the terms "characteristic frequency" and "resonant frequency" may be used interchangeably depending on context.

In one or more embodiments, instead of the direct connection to the power source 108, the variable form factor transmitter 102 receives power from the power source 108 using inductive coupling via a driving loop 109*a*. FIG. 3B shows a schematic diagram of the wireless power transfer system 100 in the inductive coupling power configuration. Details of receiving power via the driving loop 109*a* are described in reference to FIG. 3C below.

Figure 3C:
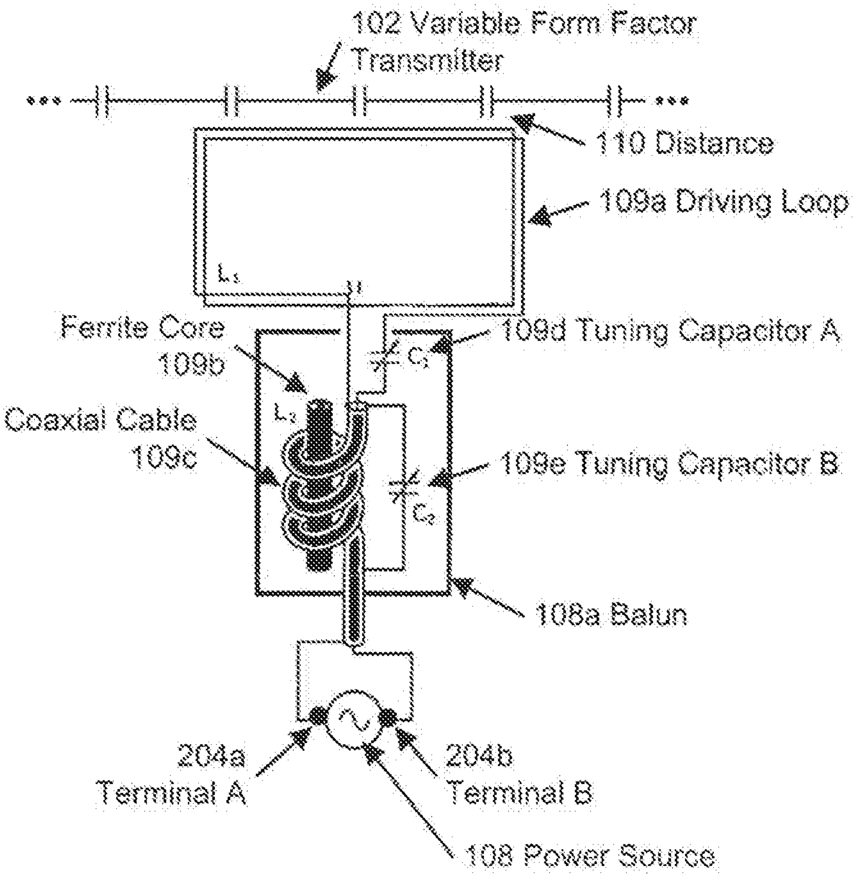

FIG. 3C shows a schematic diagram of supplying power via the driving loop 109*a* depicted in FIG. 3B above. In one or more embodiments, one or more of the modules and elements shown in FIG. 3C may be omitted, repeated, and/or substituted. Accordingly, embodiments of the disclosure should not be considered limited to the specific arrangements of modules shown in FIG. 3C.

As shown in FIG. 3C, the driving loop 109*a* includes one or more loops of conducting wire (e.g., having an inductance L1) that are coupled to the power source 108 via a balun 108*a*. The balun 108*a* includes a tuning capacitor A 109*d* (e.g., having a variable capacitance C1), a tuning capacitor B 109*e* (e.g., having a variable capacitance C2), and a coaxial cable 109 (e.g., coiled around a ferrite core 109*b* and having an inductance L2). Specifically, the driving loop 109*a* is placed at a distance 110 from the variable form factor transmitter 102 such that the power source 108 supplies power to the variable form factor transmitter 102 via electromagnetic coupling across the distance 110. In one or more embodiments, the tuning capacitor B 109*e* is tuned to resonate with inductance L2 of the ferrite core 109*b* to form a parallel resonant LC circuit, which imposes a high impedance between the two opposite ends of the coaxial cable 109. Further, the tuning capacitor A 109*d* is used to tune the resonant frequency of the driving loop 109*a* to match the frequency of the RF power source 108. The distance 110 between the driving loop 109*a* and the variable form factor transmitter 102 may be adjusted in order to match the apparent input impedance of variable form factor transmitter 102 to the impedance of the coaxial cable 109, and the output impedance of the RF power source 108.

Figure 4A:
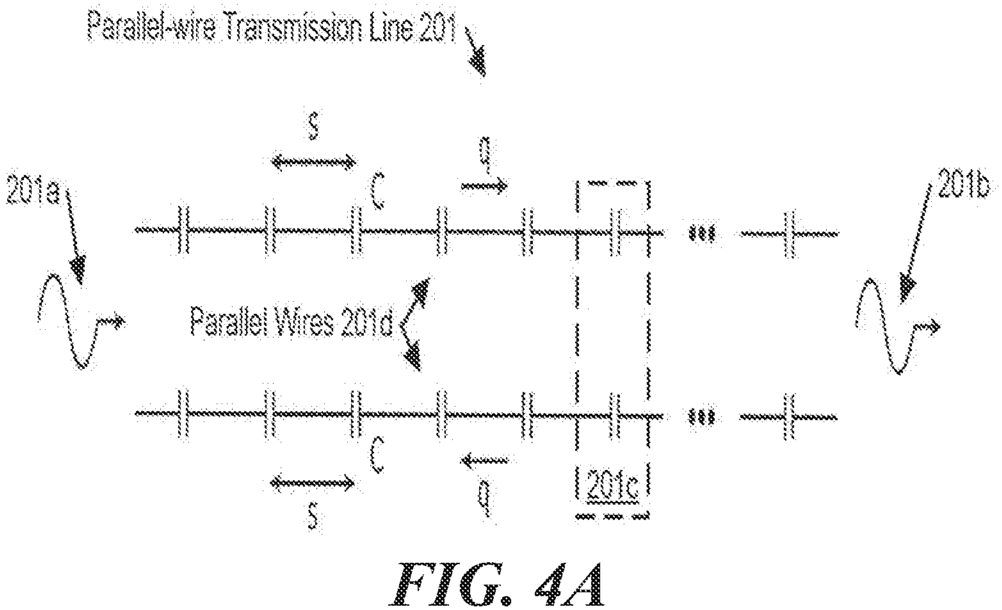
FIGS. 4A, 4B, 4C, 4D, 4E, 4F, 4G, 4H, 4J, 4K, 4L, 4M, 4N, and 4P show various diagrams for illustrating an example variable form factor transmitter in accordance with one or more embodiments of the disclosure.

FIG. 4A shows a schematic diagram of a parallel-wire transmission line 201 in accordance with one or more embodiments of the disclosure. In one or more embodiments, one or more of the modules and elements shown in FIG. 4A may be omitted, repeated, and/or substituted. Accordingly, embodiments of the disclosure should not be considered limited to the specific arrangements of modules shown in FIG. 4A.

As shown in FIG. 4A, the sinusoid-shaped icons 201*a* and 201*b* represent electromagnetic waves propagating along the parallel-wire transmission line 201. The parallel-wire transmission line 201 is composed of two parallel wires 201*d* each having wire segments joined by capacitors, where s denotes the length of each wire segment, C denotes the capacitance of each capacitor, and q denotes the electric charge displacement along the parallel-wire transmission line 201. In the context that the two parallel wires 201*d* conduct RF current (e.g., electrical current 105 depicted in FIG. 3A), each wire of two parallel wires 201*d* is also referred to as a conductor wire throughout this document. The distance between the sinusoid-shaped icons 201*a* and 201*b* corresponds to the length of the parallel-wire transmission line 201 while the spacing between the two parallel string of capacitors corresponds to the width of the parallel-wire transmission line 201. While the length of the parallel-wire transmission line 201 may be comparable to a length of other dimension of the wireless power transfer area 101, the width of the parallel-wire transmission line 201 may range from less than one centimeter to a width or other dimension of the wireless power transfer area 101. In one or more embodiments, the parallel-wire transmission line 201 corresponds to a portion of the variable form factor transmitter 102 depicted in FIG. 3A above. In other words, two sections of the string of distributed capacitor depicted in FIG. 3A may be disposed parallel to each other. Generally, the electric charge, q, displaced along the parallel-wire transmission line 201 is a function of a position along the parallel-wire transmission line 201 and time. The corresponding charge density (i.e., electric charge per unit length), pA., and electrical current, I, are given by Eq. (1) below for the parallel-wire transmission line 201. In Eq. (1), x and t denote the position along the parallel-wire transmission line 201 and time, respectively.

$$\rho_\lambda = q' = \frac{\partial q}{\partial x}, I = \dot{q} = \frac{\partial q}{\partial t}. \quad \text{(eq. 1)}$$

TABLE 1 shows additional definitions of variables used in the equations throughout this document.

TABLE 1

| | |
|---|---|
| c | Capacitance per unit length |
| l | Inductance per unit length |
| C | Capacitance of each joining capacitor |
| s | Length of each segment |
| q | Charge displacement |

TABLE 1-continued

| | |
|---|---|
| $\rho_\lambda$ | Charge density |
| $\lambda$ | Wavelength in free space |
| I | Current |
| $U_j$ | Energy stored in two joining capacitors |
| $u_E$ | Electrical energy stored per unit length |
| $u_B$ | Magnetic energy stored per unit length |
| v | Asymptotic velocity |
| $\omega_0$ | Cutoff frequency |
| $v_p$ | Phase velocity |
| $v_g$ | Group velocity |

The electrical energy, Uj, stored in a pair of adjoining capacitors (e.g., capacitor pair 201*c*) in the parallel-wire transmission line 201 is given by Eq. (2) below.

$$U_j = 2\cdot\frac{1}{2}\frac{q^2}{C} = \frac{q^2}{C}. \quad \text{(eq. 2)}$$

In the scenario where s is substantially less than the spatial variation of q, the stored energy, Uj, divided by the segment length, s, may be considered as a density of energy stored in the capacitors, C, along the parallel-wire transmission line 201. Let c denote the stray capacitance per unit length between the two parallel wires of the parallel-wire transmission line 201. The total electrical energy, UE, stored per unit length along the parallel-wire transmission line 201 is given by Eq. (3) below.

$$u_E = \frac{1}{2}\frac{\rho_\lambda^2}{C} + \frac{q^2}{sC}. \quad \text{(eq. 3)}$$

The total magnetic energy, $u_B$, stored per unit length along the parallel-wire transmission line 201 is given by Eq. (4) below.

$$u_B = \frac{1}{2}lI^2. \quad \text{(eq. 4)}$$

Accordingly, the Lagrangian of the parallel-wire transmission line 201 is given by Eq. (5) below.

$$L = U_E - U_B = \int dx(U_E - U_B) = \int dx\left[\frac{1}{2}\frac{\rho_\lambda^2}{C} + \frac{q^2}{sC} - \frac{1}{2}lI^2\right] = \int dx\left[\frac{-1}{2}q\frac{q''}{C} + \frac{q^2}{sC} - \frac{1}{2}l\dot{q}^2\right]. \quad \text{(eq. 5)}$$

The generalized momentum n, the Euler-Lagrange equation of motion, and the wave equation of the parallel-wire transmission line 201 are given by Eq. (6), Eq. (7), and Eq. (8) below.

$$\pi = \partial_{\dot{q}} L = -l\dot{q}, \quad \text{(eq. 6)}$$

$$\dot{\pi} = \partial_q L = -l\ddot{q} = \frac{q''}{c} + 2\frac{q}{sC}, \quad \text{(eq. 7)}$$

$$-\ddot{q} = -\frac{q''}{lc} + 2\frac{q}{lsC}. \quad \text{(eq. 8)}$$

Based on the wave equation Eq. (8), the dispersion relation for the parallel-wire transmission line 201 is given by Eq. (9a), Eq. (9b), and Eq. (9c) below.

$$v \equiv \frac{1}{\sqrt{lc}} \quad \text{Eq. (9a)}$$

$$\omega_0 = \frac{1}{\sqrt{lsC/2}} \quad \text{Eq. (9b)}$$

$$\omega^2 = v^2k^2 + \omega_0^2 \quad \text{Eq. (9c)}$$

In Eq. (9a), Eq. (9b), and Eq. (9c), w represents an angular frequency, k represents a wave number, v represents an asymptotic wave velocity as defined in Eq. (9a), and $\omega_o$ represents a cut off angular frequency as defined in Eq. (9b). In particular, the cut off angular frequency $\omega_o$ is independent of the length, and varies logarithmically with the width, of the parallel-wire transmission line 201. In one or more embodiments, one or more wire segments with associated capacitors of the parallel-wire transmission line 201 are detachable. Accordingly, the parallel-wire transmission line 201 may be re-configured, without substantially changing $\omega_o$, by the user to change the total length according to the dimension of the wireless power transfer area 101.

Figure 5A:
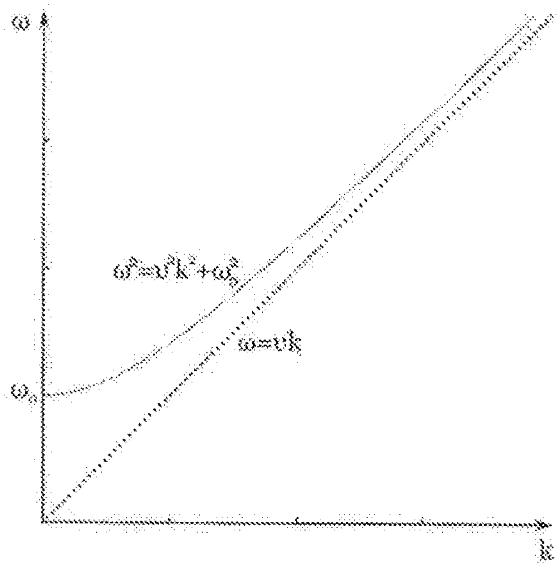
FIGS. 5A, 5B, 5C, 5D, and 5E show example characteristics of an example variable form factor transmitter in accordance with one or more embodiments of the disclosure.

Based on Eq. (9c), FIG. 5A shows a plot of angular frequency, ω, versus wave number, k, to illustrate the dispersion relation for the parallel-wire transmission line 201. In addition, the phase velocity, Vp, and group velocity, Vg, are given in Eq. (10a) and Eq. (10b) below.

$$v_p = \frac{\omega}{k} \quad \text{Eq. (10a)}$$

$$v_g = \frac{\partial\omega}{\partial k} \quad \text{Eq. (10b)}$$

Note that as the wave number k asymptotically approaches 0, the phase velocity Vp asymptotically approaches infinity, the group velocity Vg asymptotically approaches 0, and the angular frequency ω asymptotically approaches $\theta_o$.

Figure 4B:
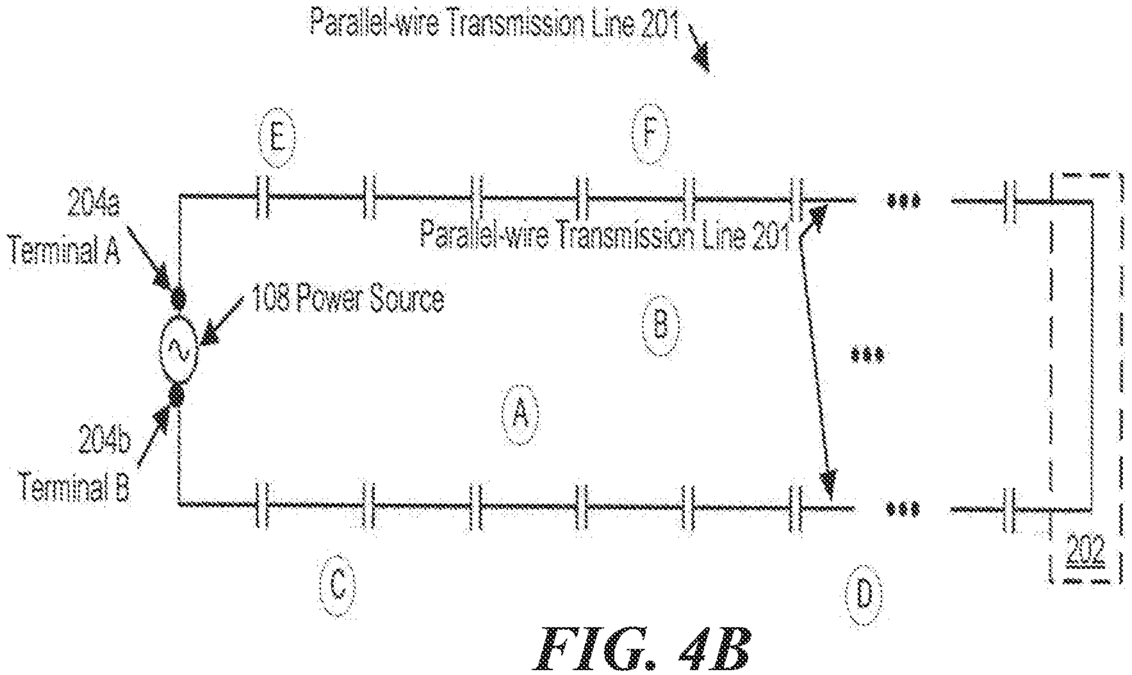

FIG. 4B shows a schematic diagram of the parallel-wire transmission line 201 driven by the RF power source 108 in accordance with one or more embodiments of the disclosure. In one or more embodiments, one or more of the modules and elements shown in FIG. 4B may be omitted, repeated, and/or substituted. Accordingly, embodiments of the disclosure should not be considered limited to the specific arrangements of modules shown in FIG. 4B.

As shown in FIG. 4B, the parallel-wire transmission line 201 is driven by the RF power source 108 connected via the terminal A 204*a* and terminal B 204*b*. Further, the parallel-wire transmission line 201 is terminated by an electrically conducting connection 202 and operating at the characteristic frequency $\omega_o$. In one or more embodiments of the disclosure, the electrically conducting connection 202 may be substituted by a variable capacitor or other electronic component, which may be used to fine tune the characteristic frequency of the parallel-wire transmission line 201.

In one or more embodiments of the disclosure, the configuration of the parallel-wire transmission line 201 shown in FIG. 4B approximates the variable form factor transmitter 102 depicted in FIG. 2A above. Similar to FIG. 3A, receiver devices (e.g., denoted as circular icons labeled as A, B, C, D, E, and F) are disposed about the parallel-wire transmission line 201 shown in FIG. 4B. The approximation is particularly suitable for the scenario where the wireless power transfer area 101 has an elongated shape and where the string of distributed capacitors of the variable form factor transmitter 102 is arranged into a pair of parallel lines according to the elongated shape of the wireless power transfer area 101. As described below, the characteristic frequency of the variable form factor transmitter 102 corresponds to coo described in reference to FIG. 4A above and is substantially independent of the length, and varies logarithmically with the width, of the parallel-wire transmission line 201.

In the configuration shown in FIG. 4B, the standing wave along the parallel-wire transmission line 201, as excited by the RF power source 108, has an infinite phase velocity. Therefore, the voltages and currents along the parallel-wire transmission line 201 are all in phase at different positions of the parallel-wire transmission line 201. In other words, the effective electrical length of the parallel-wire transmission line 201 equals zero regardless of the physical length of the parallel-wire transmission line 201. In the scenario where there is no energy loss in the parallel-wire transmission line 201, the input impedance of the parallel-wire transmission line 201 as presented to the RF power source 108 equals zero regardless of the physical length of the parallel-wire transmission line 201. In other words, the parallel-wire transmission line 201 is equivalent to an RLC circuit (not shown) resonant at $\omega_o$, regardless whether the physical length of the parallel-wire transmission line 201 is much shorter or much longer than the free-space wavelength (e.g., based on the transmission medium of the wireless power transfer area 101) of the driving frequency, i.e., $\omega_o$. Accordingly, the parallel-wire transmission line 201 driven by the RF power source 108 and terminated by the electrically conducting connection 202 may be used as a resonant power source for wireless power transfer to induce resonances of receiver devices that are placed in the vicinity of the parallel-wire transmission line 201. In particular, the resonant receiver devices couple to the electric and/or magnetic fields generated by the standing wave of the parallel-wire transmission line 201 and receive power from the electric and/or magnetic fields.

In one or more embodiments, the resonant receiver devices receive power from a near electromagnetic field of the parallel-wire transmission line 201. Even if the physical length of the parallel-wire transmission line 201 is much longer than the free-space wavelength (e.g., based on the transmission medium of the wireless power transfer area 101) of the driving frequency, the power supplied from the RF power source 108 is substantially retained in the parallel-wire transmission line 201 for transferring to the nearby resonant receiver devices without being lost to far field radiation. The quality factor of the parallel-wire transmission line due to radiation loss depends only on the wire separation and wire radius, not on the length.

Figure 4C:
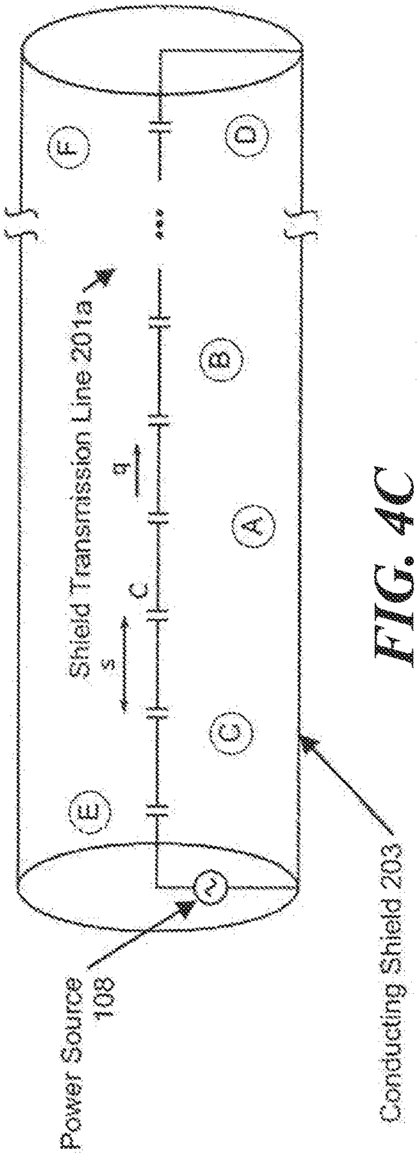

FIG. 4C shows a variation of the parallel-wire transmission line 201 with distributed capacitance in which one of the conductor wires forms a conducting shield 203 that surrounds the other conductor wire, hereafter referred to as the shielded transmission line 201*a*. For example, the conducting shield 203 may be substantially cylindrical. The shielded transmission line 201*a* shown in FIG. 4C operates by the same principle as the parallel-wire transmission line 201 shown in FIG. 4B above, except the distributed capacitance is only placed on the center conductor. In some configurations, the center conductor may not be concentric with the outer conductor (i.e., conducting shield 203). Further, the cross sections of the center conductor and outer conductor (i.e., conducting shield 203) may not be circular.

In one or more embodiments of the disclosure, the configuration of the shielded transmission line 201*a* shown in FIG. 4C approximates the variable form factor transmitter 102 depicted in FIG. 3A above. Similar to FIG. 3A, receiver device (e.g., denoted as circular icons labeled as A, B, C, D, E, and F) are disposed about the parallel-wire transmission line 201 shown in FIG. 4C. The approximation is particularly suitable for the scenario where the wireless power transfer area 101 corresponds to the interior space within a conductive enclosure, such as within a metal pipeline, an airframe of an airplane or space shuttle, etc. The characteristic frequency of the variable form factor transmitter 102, as shown in FIG. 4C, corresponds to $\omega_o$ described in reference to FIGS. 3A and 3B above and is substantially independent of the length, and varies logarithmically with the diameter, of the conducting shield 203. The characteristic frequency of the shielded transmission line 201*a* shown in FIG. 3C is given by Eq. (11). Note that this differs from Eq. (9b) by a factor of $\sqrt{2}$ due to the fact that only one of the conductor wires includes distributed capacitors.

$$\omega_0 = \frac{1}{\sqrt{lsC}} \qquad \text{Eq. (11)}$$

Figure 5B:
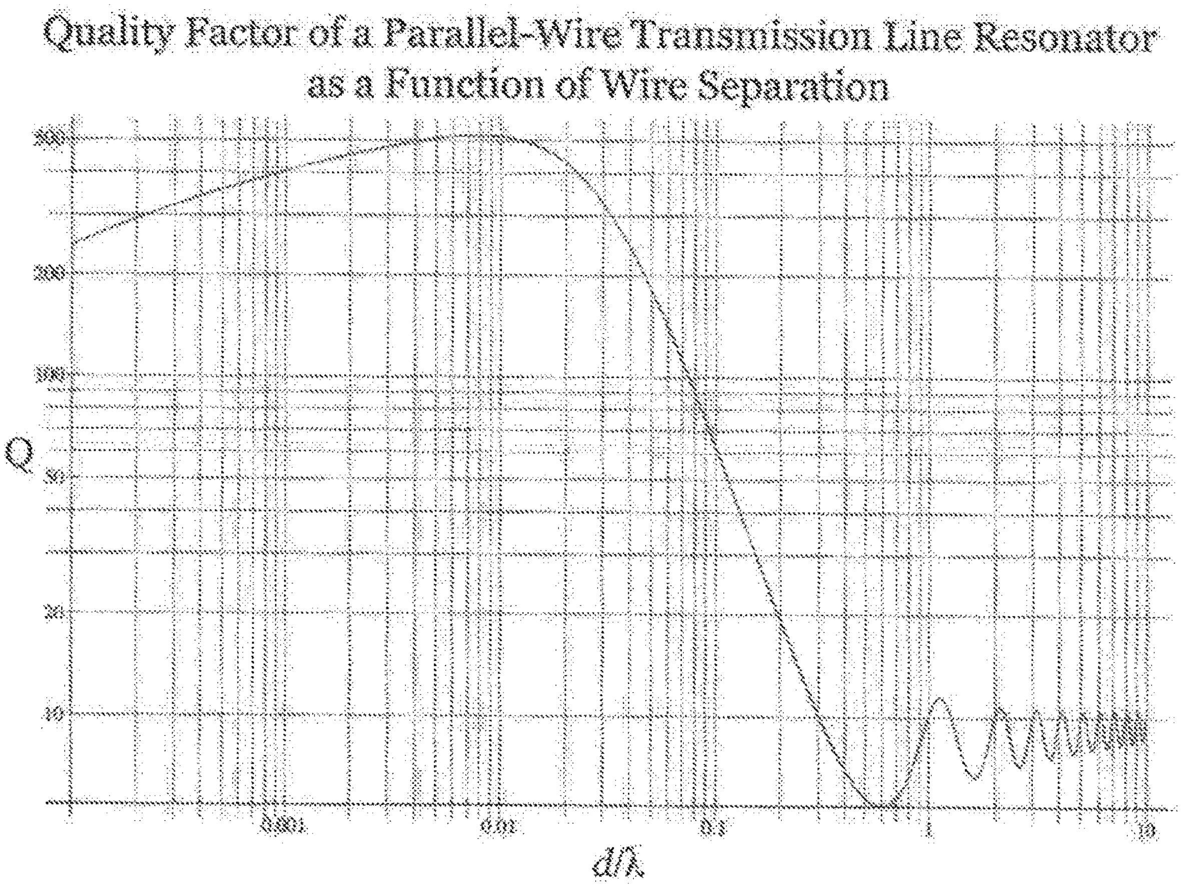

FIG. 5B shows a plot of the quality factor, Q, of a parallel-wire transmission line (e.g., shown in FIG. 4A or FIG. 4B) of arbitrary length, consisting of 14 AWG copper wire, driven at 6.78 MHz, as a function of the separation, d, (between the two wires) divided by the free-space wavelength λ. For wire separations large relative to the free-space wavelength, the Q is suppressed due to radiation loss. However, for wire separations small compared to the free-space wavelength, the radiation is suppressed and the loss is dominated by ohmic losses in the copper wire.

Note that the shielded transmission line 201 has no radiative loss due to the fact that the conducting shield 203 completely encloses the internal electromagnetic fields.

In contrast, while a conducting wire loop driven by the RF power source 108, described in reference to FIG. 4D below, may also transfer power to resonant receiver devices in the vicinity, the efficiency of the power transfer is decreased due to far field radiation as the dimension of the conducting wire loop increases to approach or exceed the free-space wavelength of the driving frequency. FIG. 5C shows a plot of the quality factor, Q, of a circular loop consisting of 14 AWG copper wire, driven at 6.78 MHz, as a function of the loop radius a divided by the free-space wavelength λ. Note that the Q becomes low, and therefore the efficiency of wireless power transfer is suppressed, as the loop radius becomes large relative to the free-space wavelength.

Figure 4D:
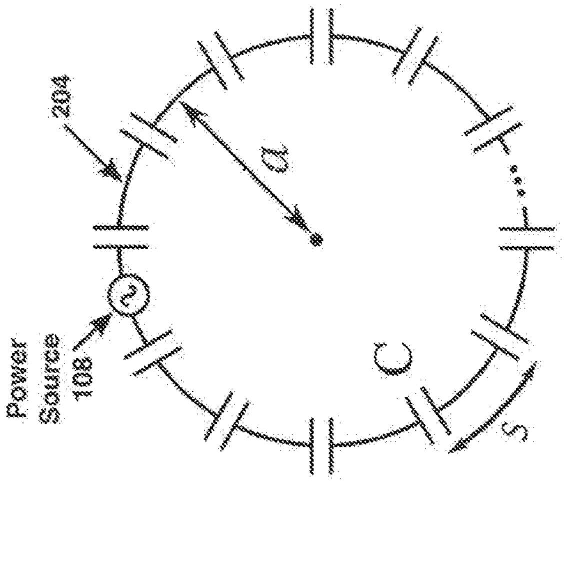
Figure 5C:
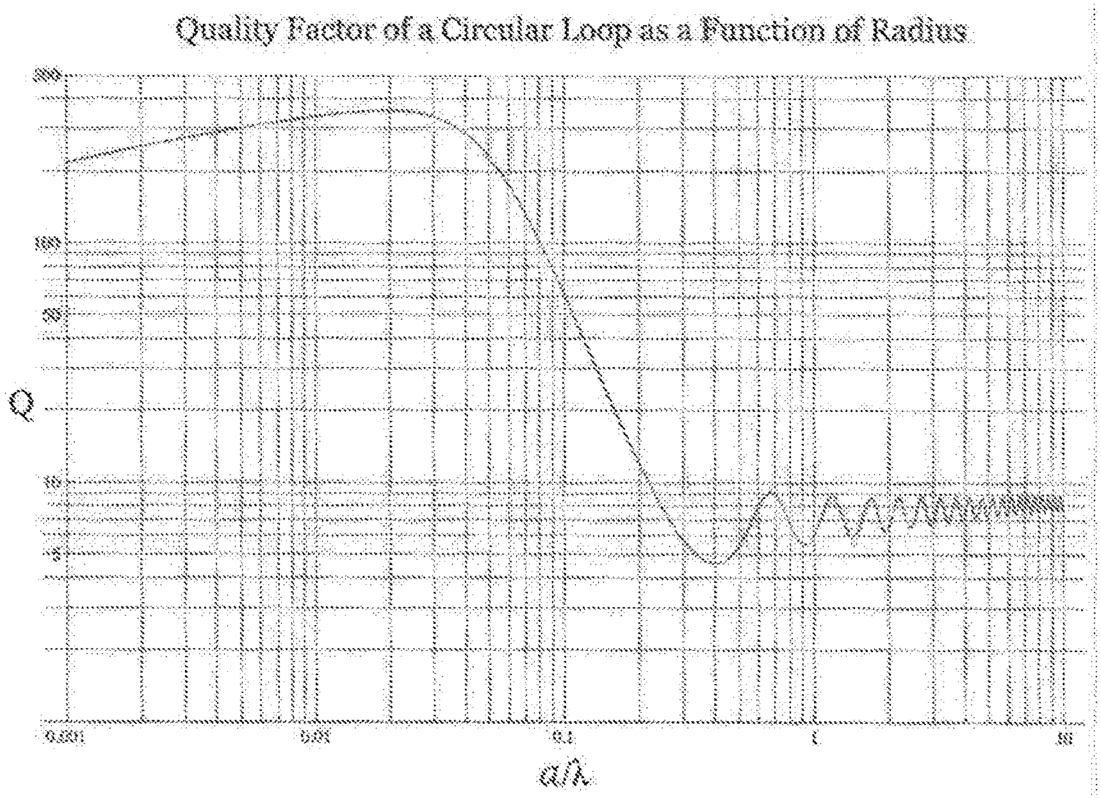

FIG. 4D shows a schematic diagram of a wire loop 204 having distributed capacitors and driven by the RF power source 108 in accordance with one or more embodiments of the disclosure. In one or more embodiments, one or more of the modules and elements shown in FIG. 4D may be omitted, repeated, and/or substituted. Accordingly, embodiments of the disclosure should not be considered limited to the specific arrangements of modules shown in FIG. 4D.

In one or more embodiments, the wire loop 204 has a circular loop radius, a, and a wire radius (corresponding to a gauge of the wire), b, (not shown) and is composed of wire segments of length s joined by a number of capacitors, C. In one or more embodiments of the disclosure, the configuration of the wire loop 204 shown in FIG. 4D approximates the variable form factor transmitter 102 depicted in FIG. 3A above. The approximation is particularly suitable for the scenario where a particular shape of the wireless power transfer area 101 matches the circular form factor of the variable form factor transmitter 102. As is described below, the characteristic frequency of the variable form factor transmitter 102 corresponds to a resonant frequency $\omega_o$ of the wire loop 204 and is substantially independent of the width and/or length (i.e., form factor) of the wire loop 204.

The inductance, L, the total capacitance, $C_{tot}$, and the resonant angular frequency, $\omega_o$, of the wire loop 204 are given by Eq. (12a), Eq. (12b), and Eq. (12c) below.

$$L = \mu a\left[\ln\left(\frac{8a}{b}\right) - 2\right] \quad \text{Eq. (12a)}$$

$$C_{tot} = \frac{C}{N} = \frac{C}{(2\pi a/s)} \quad \text{Eq. (12b)}$$

$$\omega_0^2 = \frac{1}{LC_{tot}} = \frac{1}{\mu a\left[\ln\left(\frac{8a}{b}\right) - 2\right] \cdot \frac{s}{2\pi a} \cdot C} = \frac{1}{\frac{\mu}{2\pi} sC\left[\ln\left(\frac{8a}{b}\right) - 2\right]} \quad \text{Eq. (12c)}$$

In Eq. (12a), Eq. (12b), and Eq. (12c), N denotes the number of wire segments or capacitors, C, in the wire loop 204 and μ denotes the electro-magnetic permeability of the transmission medium in the wireless power transfer area 101. In one or more embodiments, the resonant angular frequency, $\omega_o$, depends only weakly on the radius, a, of the wire loop 204 or the wire radius, b. In one or more embodiments, one or more wire segments with associated capacitors of the wire loop 204 are detachable. Accordingly, the wire loop 204 may be reconfigured, without substantially changing the resonant angular frequency $\omega_o$ by the user to change the loop radius, a, according to the dimensions of the wireless power transfer area 101.

Unlike the parallel-wire transmission line 201 shown in FIG. 4A above, the wire loop 204 becomes an efficient far field radiator as the radius, a, becomes comparable to or exceeds the free-space wavelength (e.g., based on the transmission medium of the wireless power transfer area 101) of the driving frequency, i.e., $\omega_o$. The radiation resistance (i.e., effective series resistance due to far field radiation) $R_{rad}$ of a closed loop of wire carrying a uniform current is given by the double integral over the wire path shown Eq. (13a) below.

$$R_{rad} = \frac{\zeta k^2}{4\pi}\int dr_1 \cdot dr_2 \frac{\sin(k|r_1 - r_2|)}{k|r_1 - r_2|} \quad \text{Eq. (13a)}$$

$$\zeta = \sqrt{\frac{\mu}{\epsilon}} \quad \text{Eq. (13b)}$$

$$k \equiv \frac{\omega}{c} = \frac{2\pi}{\lambda}. \quad \text{Eq. (13c)}$$

Figure 5D:
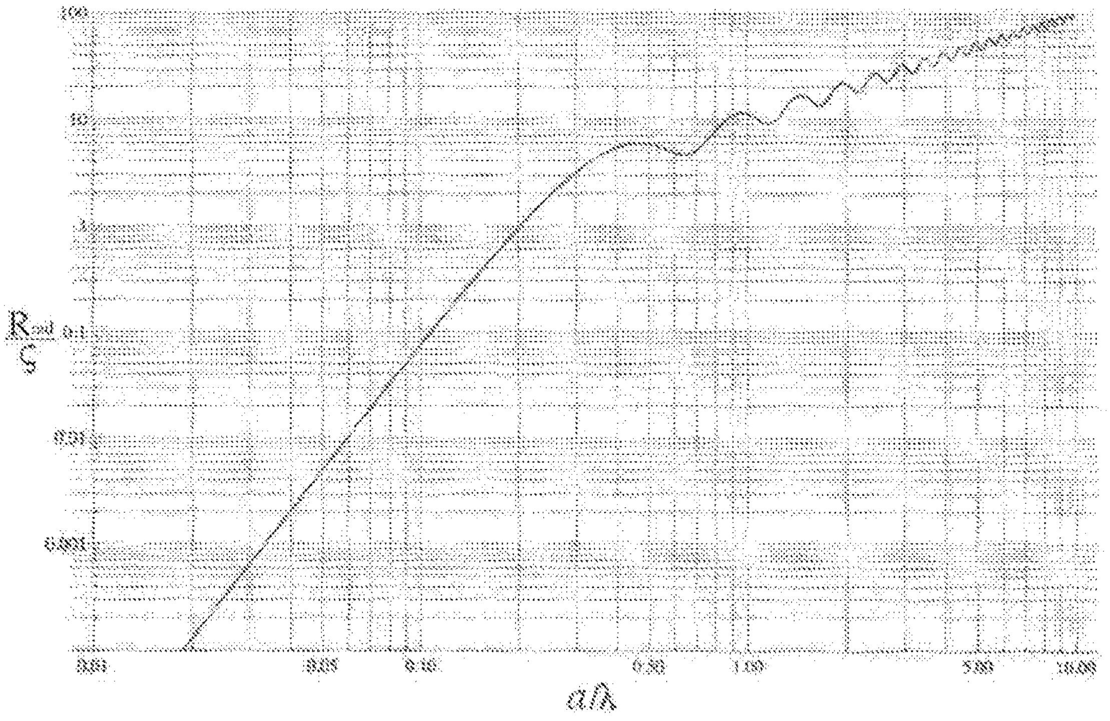

In Eq. (13a), based on the transmission medium of the wireless power transfer area 101, g is the impedance of free space, and K is the free-space wavenumber. Based on Eq. (13a) applied to the wire loop 204, FIG. 5D shows a plot of radiation resistance divided by the impedance of free space as a function of radius divided by wavelength. As can be seen from FIG. 5D, the radiation resistance has the asymptotic forms for large and small loop radius given in Eq. (14) below.

$$\frac{R_{rad}}{\zeta} \approx \frac{8\pi^5}{3}\left(\frac{a}{\lambda}\right)^4, a \ll \lambda \quad \text{Eq. (14)}$$

$$\frac{R_{rad}}{\zeta} \approx \pi^2\left(\frac{a}{\lambda}\right), a \gg \lambda.$$

The quality factor, Q, of the loop due to radiation is equal to the ratio of the inductive reactance, $\omega_o L$, divided by the total series resistance, R, which includes the radiation resistance, $R_{rad}$. As the radiation resistance increases, the quality factor decreases, causing the efficiency of the wireless power transfer to decrease.

For the circular wire loop 204 shown in FIG. 4D, Eq. (12c) applies where $\omega_0 = \sqrt{2\pi l(\mu sC(\ln(8a/b) - 2))}$ with a being the loop radius and b being the wire radius. For the parallel-wire transmission line 201 shown in FIG. 4B, Eq. (9b) applies and it can be shown that $\omega_0 = \sqrt{2\pi l(\mu sC\ln(d/b)}$, with d being the width of the parallel-wire transmission line and b being the wire radius. The characteristic frequencies, $\omega_o$, have similar values for both circular loop and parallel-wire configurations if ln(a/b)≈ln(d/b). In this manner, a single variable form factor transmitter 102 may be manufactured for use in both elongated-shaped service area and circular-shaped service area based on the user adapted elongated form factor or circular form factor. In other words, based on the wire diameter, b, used to manufacture the variable form factor transmitter 102, the user may select the loop radius, a, and the parallel-wire transmission line width, d, such that ln(a/b)≈ln(d/b). In this manner, one single variable form factor transmitter manufactured in the factory can be configured into either a parallel-wire form factor depicted in FIG. 4B or a circular form factor depicted in FIG. 4D to supply power to the same set of receiving devices that are tuned to the particular resonant frequency, $\omega_o$.

Figure 4H:
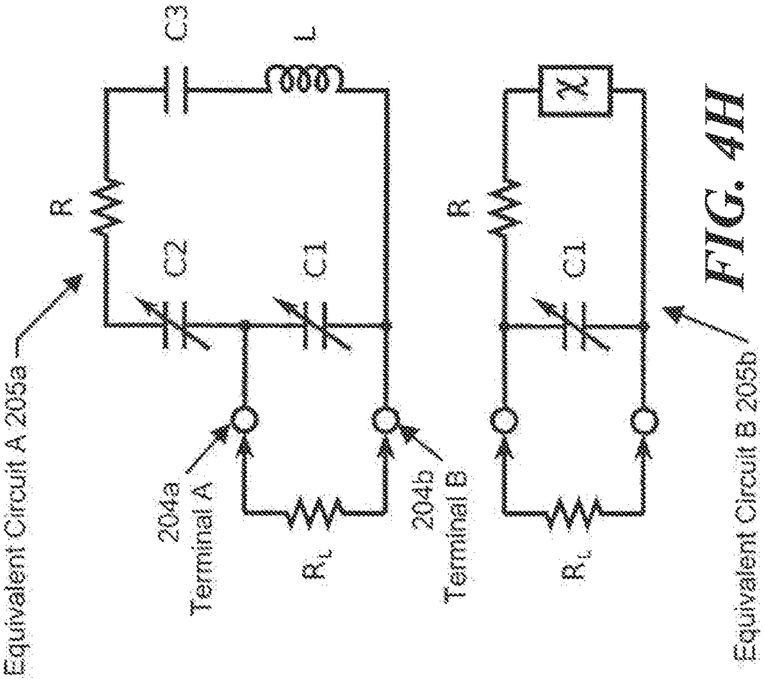
Figure 4E:
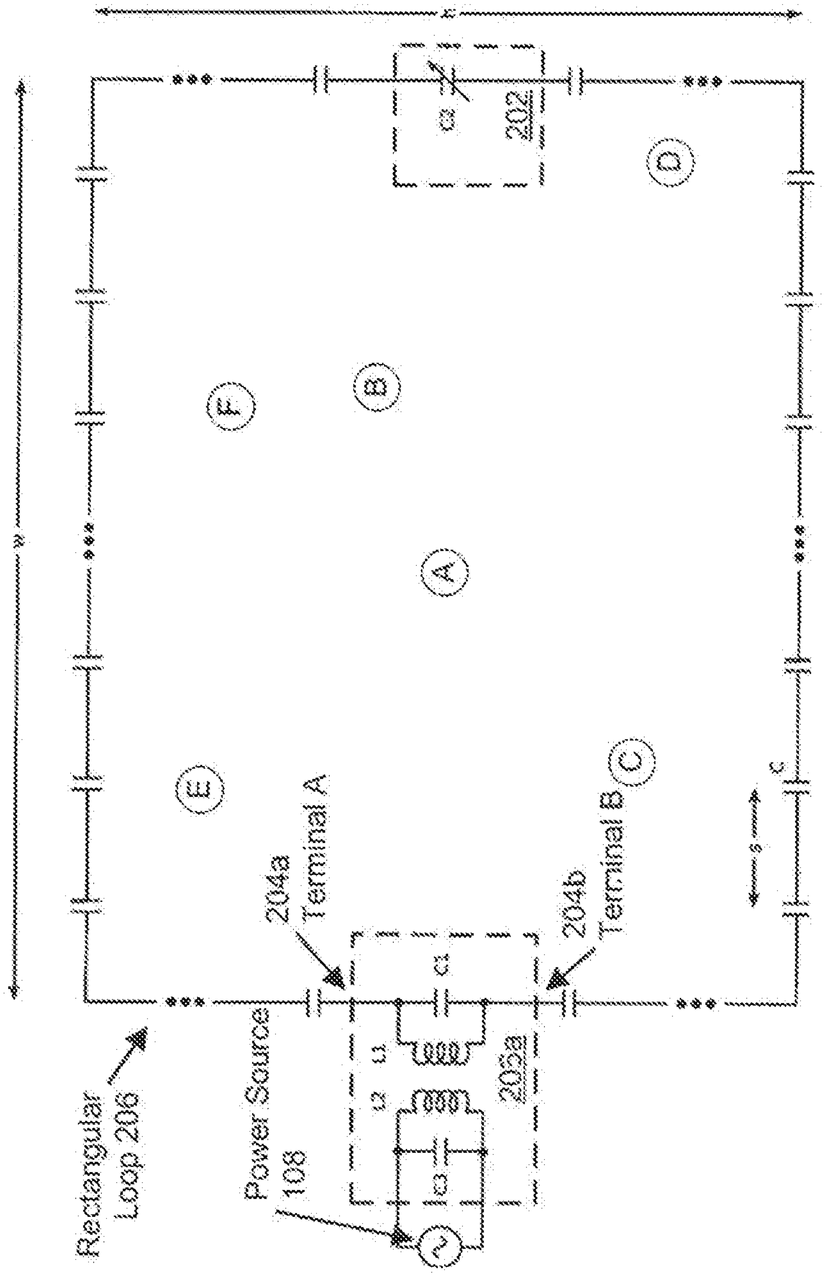

FIG. 4E shows a schematic diagram of a rectangular loop 206 having distributed capacitors and driven by the RF power source 108 in accordance with one or more embodiments of the disclosure. In one or more embodiments of the disclosure, the configuration of the rectangular loop 206 approximates the variable form factor transmitter 102 depicted in FIG. 3A above. Similar to FIG. 3A, receiver devices (e.g., denoted as circular icons labeled as A, B, C, D, E, and F) are disposed about the rectangular loop 206 shown in FIG. 4E. For example, the rectangular loop 206 may correspond to the parallel-wire transmission line 201 shown in FIG. 4B that has been adapted by a user to fit a rectangular-shaped wireless power transfer area. In another example, the rectangular loop 206 may correspond to the wire loop 204 shown in FIG. 4D that has been adapted by a user to fit a rectangular-shaped wireless power transfer area. As shown in FIG. 4E, the rectangular loop 206 is driven by the RF power source 108 using a transformer coupling scheme. In particular, the transformer 206*a* includes a capacitor $C_1$ in parallel to the primary coil $L_1$ and a capacitor $C_3$ in parallel to the secondary coil $L_2$. In addition, the electrically conducting connection 202 shown in FIG. 4B is substituted by a capacitor $C_2$. The capacitance values of the capacitors $C_1$, $C_2$, and $C_3$ may be adjusted in the factory and/or by the user for impedance matching between the power source 108 and the rectangular loop 206 and for tuning the resonant frequency of the rectangular loop 206.

Figure 4F:
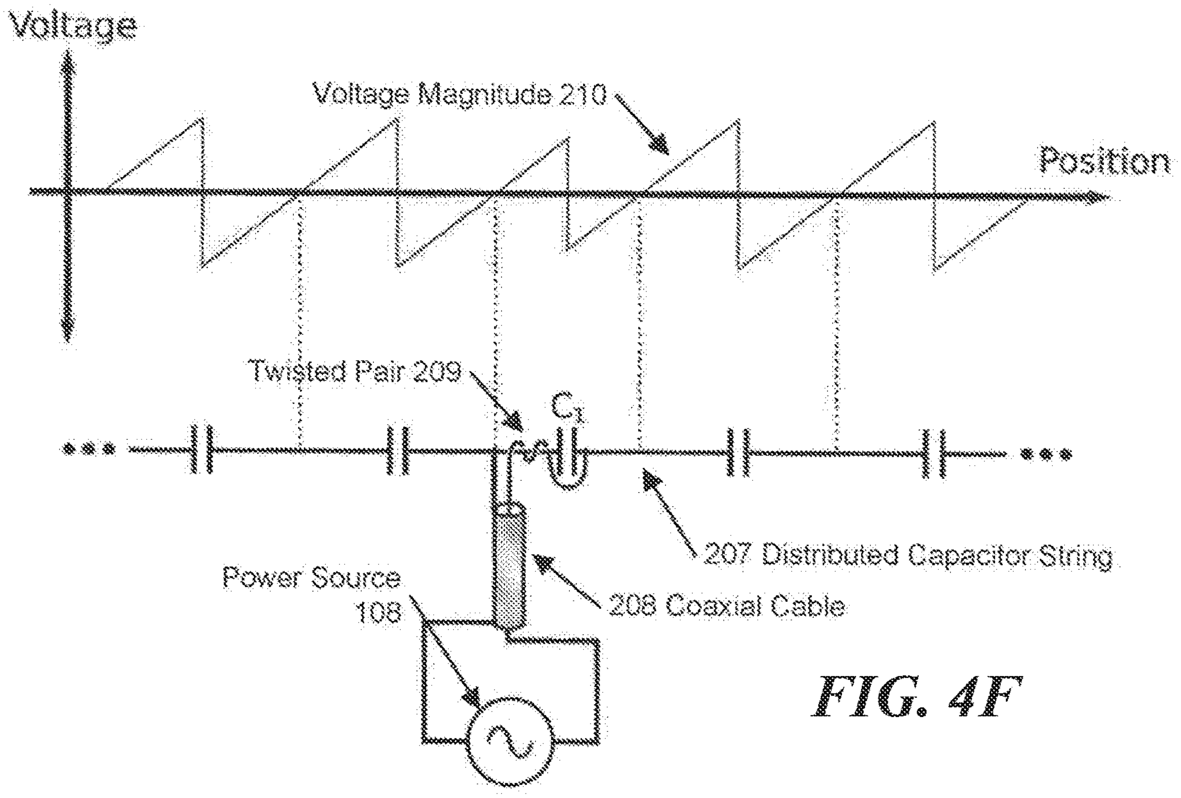

FIG. 4F shows a schematic diagram of connecting the power source 108 using a capacitive coupling scheme. In particular, the power source 108 is connected to a distributed capacitor string 207, via a coaxial cable 208 and a twisted pair 209, at opposite terminals of a tuning capacitor C1. The value of the tuning capacitor C1 may be adjusted in the factory or by the user to provide a proper impedance match to both the RF power source 108 and the coaxial cable 208. By attaching the shield of the coaxial cable 208 to a voltage node of the distributed-capacitor string 207, the shield of the coaxial cable 208 is maintained at ground potential.

In one or more embodiments, the distributed capacitor string 207 may correspond to a portion of the parallel-wire transmission line 201 shown in FIGS. 4B and 4C, a portion of the wire loop 204 shown in FIG. 4D, or a portion of the rectangular loop 206 shown in FIG. 4E. The voltage magnitude relative to ground 210 induced by the power source 108, is shown as a function of the position along the distributed capacitor string 207.

Figure 4G:
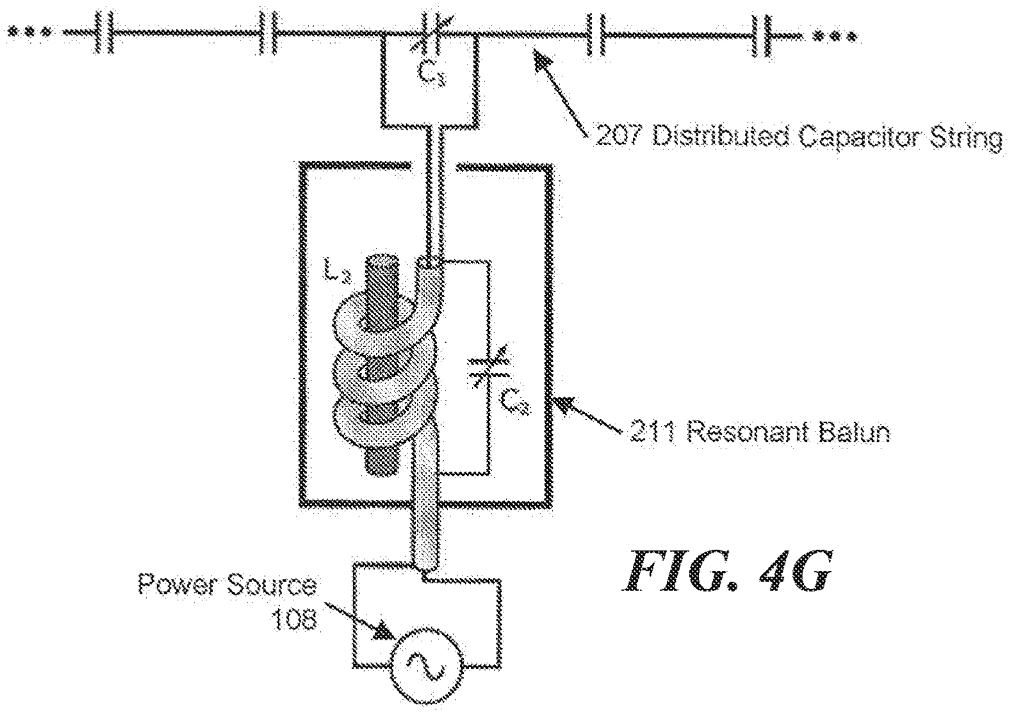

FIG. 4G shows a schematic diagram for connecting the power source 108 to the variable form factor transmitter using an alternative capacitive coupling scheme. As shown in FIG. 4G, a resonant balun 211 is used to connect the power source 108 to the tuning capacitor, C1.

Figure 5E:
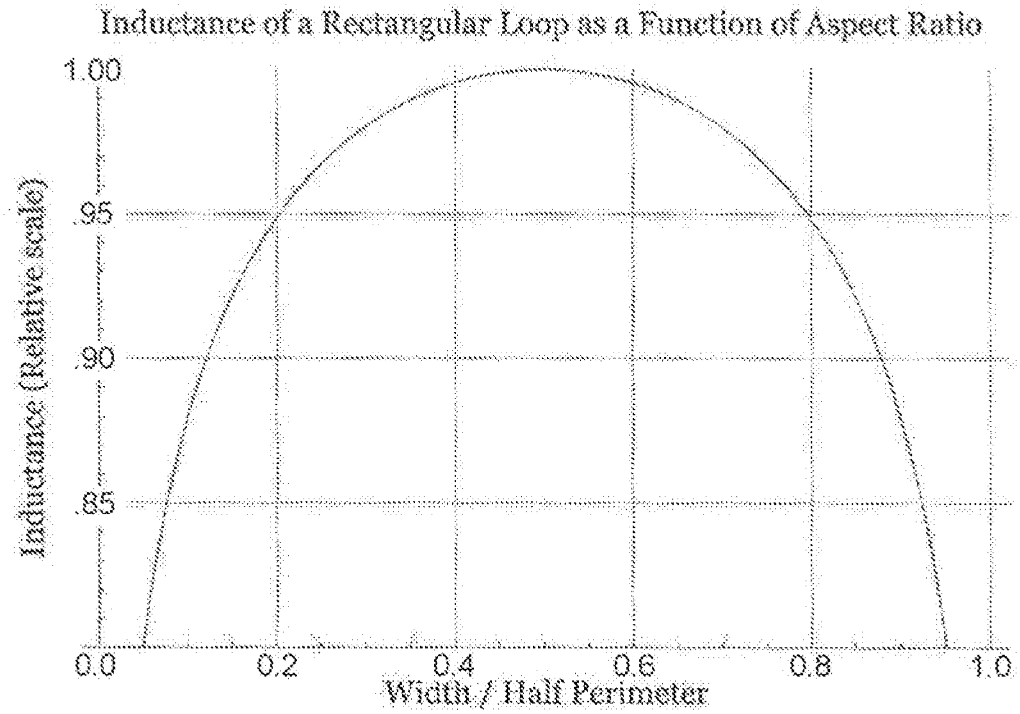

FIG. 5E is a plot of inductance as a function of the aspect ratio (represented by width/half-perimeter) of a rectangular loop (e.g., rectangular loop 206 depicted in FIG. 3E above), made from 83 feet of 14 AWG wire, and driven at 6.78 MHz. The rectangular loop with the range of aspect ratios shown in FIG. 5E represents various shapes the wire loop 204 shown in FIG. 4D may be adapted by the user to fit any wireless power transfer area. The plot shows the inductance of the rectangular loop as the perimeter (i.e., corresponding to the circumference of the wire loop 204) is held fixed but the aspect ratio is varied. As can be seen from the plot, the inductance varies less than 20% as the aspect ratio is varied over a wide range between 0.05 and 0.95. Accordingly, the characteristic frequency of the wire loop 204 varies less than 10% while being adapted into a rectangular loop over a wide range of aspect ratios. This demonstrates the relative insensitivity of the resonant frequency of the loop with distributed capacitance to variations in the adapted form factor.

Referring back to the discussion of FIG. 3A, in one or more embodiments of the disclosure, the wireless power transfer system 100 provides wireless power transfer across the wireless power transfer area 101 based on the ISM band. In the scenario where the variable form factor transmitter 102 is approximated by the parallel-wire transmission line 201 shown in FIG. 4A, 4B, or 4C, the values of the wire segment length s, the inductance per unit length 1, and the capacitor C may be chosen in the factory, based on Eq. (9b), to maintain the resonant angular frequency $\omega_o$ of the parallel-wire transmission line 201 equal to the angular frequency of the RF power source, which may be within the type A frequency range (i.e., 6.765 MHz-6.795 MHz) defined in the ITU Radio Regulations Article 5, footnote 5.138.

In the scenario where the variable form factor transmitter 102 is approximated by the wire loop 204 shown in FIG. 4D, the values of the wire segment length, s, and the capacitor, C, may be chosen in the factory, based on Eq. (12c), to maintain the resonant angular frequency $\omega_o$ of the wire loop 204 equal to the angular frequency of the RF power source, which may be within the type A frequency range (i.e., 6.765 MHz-6.795 MHz) defined in the ITU Radio Regulations Article 5, footnote 5.138.

In one or more embodiments of the disclosure, the aforementioned manufacturing tolerance is controlled such that the resulting capacitance range, length range, and inductance range do not cause the resonant angular frequency $\omega_o$ to deviate from the type A frequency range (i.e., 6.765 MHz-6.795 MHz). In addition for both scenarios described above, approximation error exists due to physical difference between the user adapted form factor of the variable form factor transmitter 102 and the simplified form factor of the parallel-wire transmission line 201 or the wire loop 204. In one or more embodiments of the disclosure, to compensate for the aforementioned manufacturing tolerance and the approximation error, the input impedance, and the characteristic frequency of the variable form factor transmitter 102 may be adjustable in the factory as well as by the user.

Further to the discussion of FIG. 3A above, FIG. 4H shows schematic diagrams of an equivalent circuit A 205*a* and an equivalent circuit B 205*b* of the variable form factor transmitter 102. For optimal power transfer from the power source 108, the input impedance of the variable form factor transmitter 102 is matched to the output impedance (represented by the resistor $R_L$) of the power source 108. The resistor R is an effective series resistance representing all sources of loss (e.g., ohmic loss, radiation loss, dielectric loss, etc.) of the variable form factor transmitter 102. The variable capacitor $C_1$ determines the apparent input impedance of the variable form factor transmitter 102 at its resonant frequency, while the variable capacitor $C_2$ sets the resonant frequency.

The equivalent circuit B 205*b* corresponds to a simplified form of the equivalent circuit A 205*a* where $C_2$, $C_3$, and L have been combined into a single reactance, $\chi$. The input impedance of the variable form factor transmitter 102 is equal to $R_L$ when $C_1$ has the value given by Eq. (15).

$$C_1 = \frac{1}{\omega_0 R_L}\sqrt{\frac{R_L}{R} - 1} \qquad \text{Eq. (15)}$$

For the case where $R_L<R$, the transformer coupling scheme shown in FIG. 4E may be used. For the case where $R_L \geq R$, the capacitive coupling scheme shown in FIG. 4F may be used.

Figure 4J:
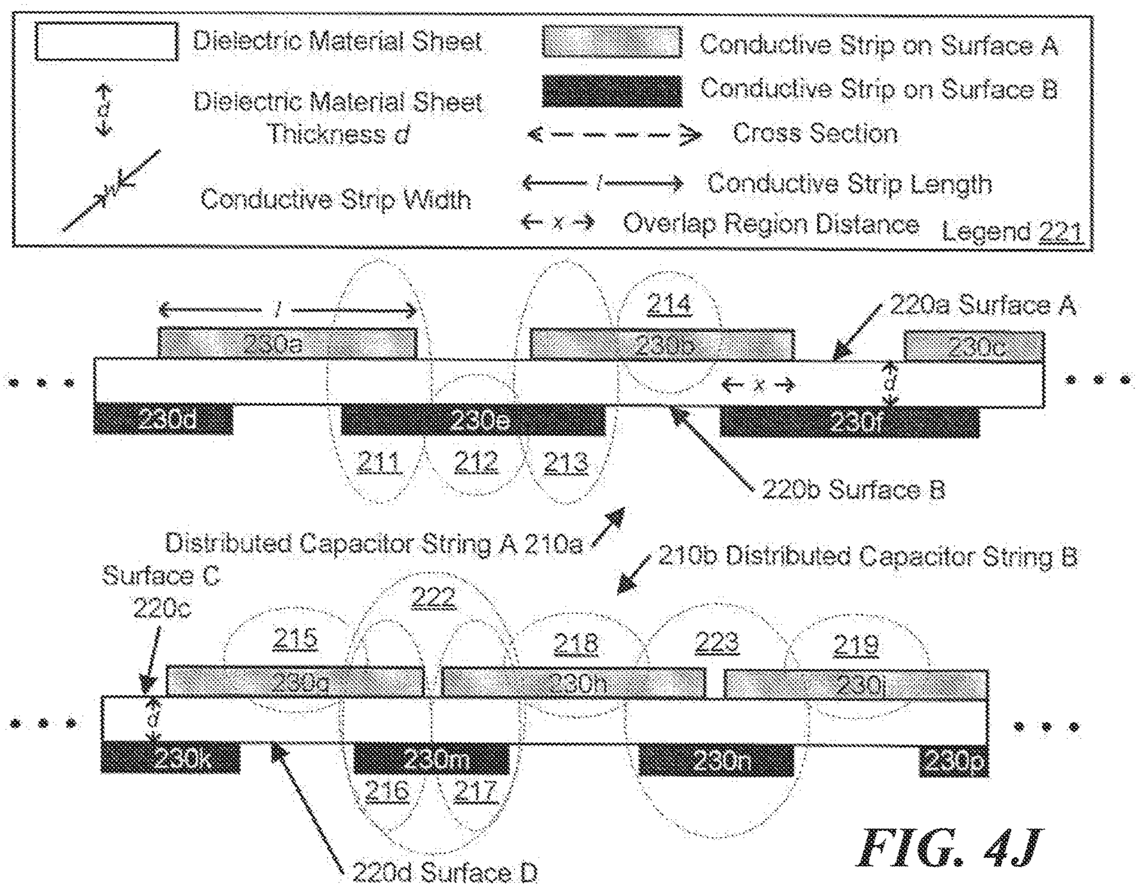

FIG. 4J shows example constructions of the variable form factor transmitter 102, depicted based on the legend 221, in accordance with one or more embodiments. In one or more embodiments, one or more of the modules and elements shown in FIG. 4J may be omitted, repeated, and/or substituted. Accordingly, embodiments of the disclosure should not be considered limited to the specific arrangements of modules shown in FIG. 4J.

As shown in FIG. 4J, the distributed capacitor string A 210*a* and distributed capacitor string B 210*b* are two example constructions of the variable form factor transmitter 102 depicted in FIGS. 3A and 3B above. Accordingly, the wire loop 204 and the rectangular loop 206, respectively depicted in FIGS. 4D and 4E above, may be based on the distributed capacitor string A 210*a*, the distributed capacitor string B 210*b*, or a combination thereof. In particular, the distributed capacitor string A 210*a* and distributed capacitor string B 210*b* show two example constructions corresponding to a cross-sectional view of the wire loop 204 or the rectangular loop 206. Specifically, the cross-sectional view includes a cross-section of consecutive capacitors and wire-segments in the wire loop 204 or the rectangular loop 206.

The distributed capacitor string A 210*a* includes capacitors constructed from conductive strips 230*a*, 230*b*, 230*c*, 230*d*, 230*e*, 230*f*, etc. attached to two opposing surfaces (i.e., surface A 220*a*, surface B 220*b*) of a dielectric material sheet. Specifically, a sheet has a three-dimensional (3D) form factor with the majority (e.g., greater than 90%) of surface area occupied by the two opposing surfaces. In other words, the thickness (i.e., distance between the two opposing surfaces) of the sheet is substantially less than each dimension of the two opposing surfaces. In this context, the 3D form factor of the sheet may be represented as a two-dimensional (2D) form factor with the thickness along a third dimension perpendicular to a surface (e.g., surface A 220*a*, surface B 220*b*) of the 2D form factor. A conductive strip is a sheet of conductive material that is attached to, and has a substantially smaller (e.g., less than 10%) area than, the dielectric material sheet. The distributed capacitor string A 210*a* is depicted in a cross-sectional view showing cross-sections of the conductive strips and the dielectric material sheet. In particular, the cross-sectional view cuts across the surface A 220*a* and surface B 220*b* along the third dimension to show the thicknesses of the conductive strips and the dielectric material sheet.

In one or more embodiments, one or more of the conductive strips 230*a*, 230*b*, 230*c*, 230*d*, 230*e*, 230*f*, etc. are printed on the surface A 220*a* and/or surface B 220*b* using conductive ink, paste, paint, or other conductive coating material. In one or more embodiments, one or more of the conductive strips 230*a*, 230*b*, 230*c*, 230*d*, 230*e*, 230*f*, etc. are formed by selectively etching one or more conductive films laminated with the dielectric material sheet. For example, the conductive film(s) and the dielectric material sheet may be laminated together by heat, pressure, adhesive, welding, or other suitable method.

For example, the capacitor 211 includes overlapping portions of the conductive strip 230*a* and conductive strip 230*e*, respectively, attached to the surface A 220*a* and surface B 220*b*, that are separated by a thickness d of the dielectric material sheet. The overlapping portions of the conductive strip 230*a* and conductive strip 230*e* form two electrodes in a parallel-plate configuration of the capacitor 211. Similarly, the capacitor 213 includes overlapping portions of the conductive strip 230*b* and conductive strip 230*e*, respectively attached to the surface A 220*a* and surface B 220*b*, that are separated by the thickness d of the dielectric material sheet. The overlapping portions of the conductive strip 230*b* and conductive strip 230*e* form two electrodes in the parallel-plate configuration of the capacitor 213. The overlapping portions of two adjacent conductive strips are referred to as the overlap region having a distance x. Further, each of the conductive strips 230*a*, 230*b*, 230*c*, 230*d*, 230*e*, 230*f*, etc. acts as an inductive segment that connects two adjacent capacitors in the distributed capacitor string A 210*a*. For example, the conductive strip 230*e* acts as, or otherwise implements, the inductive segment 212 to connect the capacitor 211 and capacitor 213 in series. Accordingly, the capacitor 211 and the inductive segment 212 form one of the multiple capacitor-wire segments of the distributed capacitor string A 210*a*. Similarly, the capacitor 213 and the inductive segment 214 form another one of the multiple capacitor-wire segments of the distributed capacitor string A 210*a*. In the distributed capacitor string A 210*a*, the surface of the dielectric material sheet, where the inductive segments are attached, alternates between the surface A 210*a* and surface B 210*b*. For example, the inductive segment 212 and one electrode of the capacitor 213 are integrated as a single conductive strip 230*e* attached to the surface A 210*a*, while the inductive segment 214 and the other electrode of the capacitor 213 are integrated as a single conductive strip 230*b* attached to the opposing surface B 210*b*. In this context, each capacitor-wire segment shown in the distributed capacitor string A 210*a* is a first type of integrated capacitor-wire segment. As used herein, the integrated capacitor-wire segment is a capacitor and an inductive segment that are connected in series where the inductive segment and one electrode of the capacitor are integrated into a single conductive strip.

Further as shown in FIG. 4J, the distributed capacitor string B 210*b* includes capacitors constructed from conductive strips 230*g*, 230*h*, 230*j*, 230*k*, 230*m*, 230*n*, 230*p*, etc. attached to two opposing surfaces (i.e., surface C 220*c*, surface D 220*d*) of a dielectric material sheet. Similar to the distributed capacitor string A 210*a*, the distributed capacitor string B 210*b* may be constructed by printing, lamination, etching, or combinations thereof. For example, the capacitor 215 includes overlapping portions of the conductive strip 230*g* and conductive strip 230*m*, respectively attached to the surface C 220*c* and surface D 220*d*, that are separated by the thickness d of the dielectric material sheet. The overlapping portions of the conductive strip 230*g* and conductive strip 230*m* form two electrodes in the parallel-plate configuration of the capacitor 216. The capacitor 217 includes overlapping portions of the conductive strip 230*h* and conductive strip 230*m*, respectively attached to the surface C 220*c* and surface D 220*d*, that are separated by the thickness d of the dielectric material sheet. The overlapping portions of the conductive strip 230*h* and conductive strip 230*m* form two electrodes in the parallel-plate configuration of the capacitor 217. The capacitor 217 and capacitor 216 are connected together in series at the conductive strip 230*m* to form a combined capacitor 222 that is itself connected between the conductive strip 230*g* and conductive strip 230*h*. Similarly, the combined capacitor 223, including two capacitors connected in series, is connected between the conductive strip 230*h* and conductive strip 230*j*. Further, each of the conductive strips 230*g*, 230*h*, 230*j*, etc. acts as an inductive segment that connects two adjacent combined capacitors in the distributed capacitor string B 210*b*. For example, the conductive strip 230*h* acts as, or otherwise implements, the inductive segment 218 to connect the combined capacitor 222 and combined capacitor 223 in series. Accordingly, the combined capacitor 222 and the inductive segment 218 form one of the multiple capacitor-wire segments of distributed capacitor string B 210*b*. Similarly, the combined capacitor 223 and the inductive segment 219 form another one of the multiple capacitor-wire segments of the distributed capacitor string B 210*b*. In the distributed capacitor string B 210*b*, the inductive segments 215, 218, 219, etc. are attached to a single surface (i.e., surface C 220*c*) of the dielectric material sheet. For example, the inductive segment 218 and one electrode of the combined capacitor 223 are integrated as a single conductive strip 230*h* attached to the surface C 210*c*, while the inductive segment 219 and the other electrode of the combined capacitor 223 are integrated as a single conductive strip 230*j* attached to the same surface C 210*c*. In this context, each capacitor-wire segment shown in the distributed capacitor string B 210*b* is a second type of integrated capacitor-wire segment.

As noted above, the wire loop 204 and the rectangular loop 206, respectively depicted in FIGS. 4D and 4E above, may be based on the distributed capacitor string A 210*a*, the distributed capacitor string B 210*b*, or a combination thereof. In other words, the first type of integrated capacitor-wire segment(s) in the distributed capacitor string A 210*a* and/or the second type of integrated capacitor-wire segment (s) in the distributed capacitor string B 210*b* may be included in the wire loop 204 and/or the rectangular loop 206, respectively depicted in FIGS. 4D and 4E above. Although a specific number of integrated capacitor-wire segments are shown in the distributed capacitor string A 210*a* and the distributed capacitor string B 210*b* above, the wire loop 204 and/or the rectangular loop 206 may also include more number of integrated capacitor-wire segments of either type, or less number of integrated capacitor-wire segments of either type, than what is shown in the distributed capacitor string A 210*a* and the distributed capacitor string B 210*b*. In one or more embodiments, either type or both types of integrated capacitor-wire segments may be combined with other forms of capacitor-wire segments (e.g., based on discrete capacitor(s) and inductor(s)) to form the wire loop 204 and/or the rectangular loop 206, respectively depicted in FIGS. 4D and 4E above.

Figure 4K:
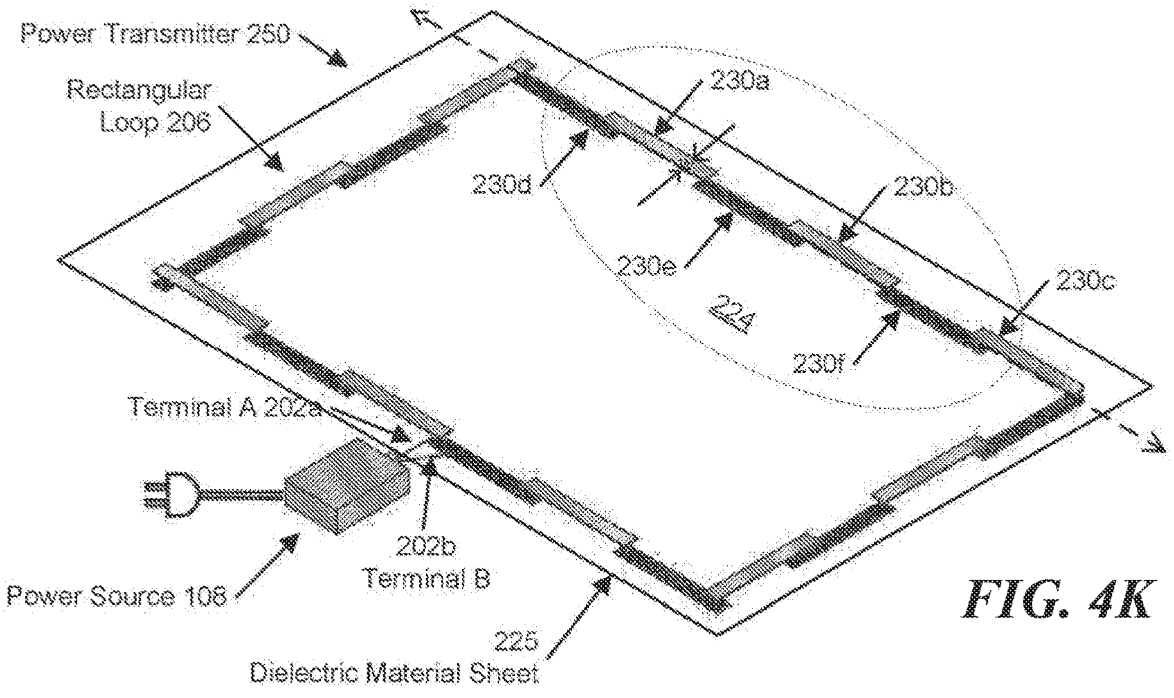

FIG. 4K shows an example construction of the variable form factor transmitter 102, depicted based on the legend 221, in accordance with one or more embodiments. In one or more embodiments, one or more of the modules and elements shown in FIG. 4K may be omitted, repeated, and/or substituted. Accordingly, embodiments of the disclosure should not be considered limited to the specific arrangements of modules shown in FIG. 4K.

As shown in FIG. 4K, the power transmitter 250, depicted based on the legend 221, shows an example construction corresponding to a three-dimensional (3D) view of FIG. 4E above. The rectangular loop 206 of the power transmitter 250 is based on the distributed capacitor string A 210*a* described in reference to FIG. 4J above. Specifically, a portion 224 of the rectangular loop 206 corresponds to a 3D view of the distributed capacitor string A 210*a* depicted in FIG. 4J. In other words, the distributed capacitor string A 210*a* depicted in FIG. 4J corresponds to a cross section (designated by the double arrowed and dashed line) of the portion 224. The thicknesses of the conductive strips and the dielectric material sheet in the distributed capacitor string A 210*a* are omitted in the 3D view for clarity of showing the aforementioned 2D form factors.

RF characteristics of the rectangular loop 206 is described below, where the width, length, and number of overlap regions of the rectangular loop 206 are denoted as a, b, and n, respectively. The overlap area A between two adjacent conductive strips may be computed using Eq. (16), where the conductive strip width, conductive strip length, and overlapping region distance are denoted as w, l, and x, respectively.

$$A = w \times x \qquad \text{Eq. (16)}$$

The capacitance of each overlap region may be computed using Eq. (17), where the dielectric constant and the thickness of the dielectric material sheet, are denoted as ε and d, respectively.

$$C = \frac{\epsilon A}{d}. \qquad \text{Eq. (17)}$$

The total capacitance of the rectangular loop 206 may be computed using Eq. (18).

$$C_{tot} = \frac{C}{n}. \qquad \text{Eq. (18)}$$

The total inductance of the rectangular loop 206 may be computed using Eq. (19) and Eq. (20).

$$L = \frac{\mu}{\pi}\left[a\ln\frac{2a}{\rho} + b\ln\frac{2b}{\rho} + \right. \qquad \text{Eq. (19)}$$

-continued $$\left. 2\sqrt{a^2+b^2} - a\sinh^{-1}\frac{a}{b} - b\sinh^{-1}\frac{b}{a} - 2(a+b)\right)\Big].$$

The resonant frequency $$\omega_0 = \frac{1}{\sqrt{LC_{tot}}}. \qquad \text{Eq. (21)}$$

Additional relationships between the resonant frequency and other parameters of the rectangular loop 206 include Eq. (22), Eq. (23), and Eq. (24).

$$C_{tot} = \frac{1}{L\omega_0^2}, \qquad \text{Eq. (22)}$$

$$\frac{\epsilon A}{d} = \frac{n}{L\omega_0^2}, \qquad \text{Eq. (23)}$$

$$\frac{A}{d} = \frac{n}{\epsilon L\omega_0^2}. \qquad \text{Eq. (24)}$$

TABLE 2 lists four examples of the RF characteristics of the rectangular loop 206 based on the equations above.

TABLE 2

| d (mm) | d ($mm^2$) | n | ε (F/m) | L (H) | $\omega_0^2$ ($Hz^2$) |
|---|---|---|---|---|---|
| 894.5 | 63.5 | 20 | 8.854E−12 | 1.753E−6 | 1.8148E15 |
| 100.3 | 6.35 | 20 | 8.854E−12 | 1.753E−6 | 1.8148E15 |
| 767.3 | 63.5 | 10 | 8.854E−12 | 1.753E−6 | 1.8148E15 |
| 8.945 | 63.5 | 20 | 8.854E−12 | 1.753E−6 | 1.8148E13 |

In one or more embodiments, the power transmitter 250 is configured based on a predetermined wireless power transfer area. For example, the predetermined wireless power transfer area may be a tabletop surface where one or more mobile receiver devices (e.g., mobile phone) are placed to receive wireless power transfer. The rectangular loop 206 may be movably or permanently disposed along a path based on the tabletop surface. For example, the path may be the edges of the tabletop surface, on top of or beneath the tabletop surface, on a fixture or ceiling above the tabletop surface, on or embedded in the floor below the tabletop surface, etc. The power source 108 is connected to the capacitor-wire segments via the terminal A 202*a* and terminal B 202*b*, and may be plugged into a power outlet on a wall near the tabletop surface. The dielectric material sheet 225 encompasses at least a portion of the path to implement the capacitor(s) of the rectangular loop 206 and to provide mechanical support for the rectangular loop 206.

In another example, the predetermined wireless power transfer area may be a space adjacent to a window where one or more receiver devices (e.g., mobile phone) are disposed about the space to receive wireless power transfer. The rectangular loop 206 may be movably or permanently disposed along a path based on the window. For example, the path may be the edges of the window frame, in front of or behind the window glass surface, embedded in the window glass or the window frame, etc. The power source 108 may be plugged into a power outlet on a wall where the window is mounted, or wired to the power outlet behind the surface of the wall.

In one or more embodiments, one or more of the dielectric material sheet, conductive strips, and/or integrated capacitor-wire segments may be rigid or pliable, transparent, translucent, or opaque depending on respective thicknesses and/or compositions. Although 2D form factors of the dielectric material sheet, conductive strips, and/or integrated capacitor-wire segments are shown as rectangular shapes in FIG. 4K, different 2D form factors (e.g., polygonal, circular, oval, elliptical, spiral, etc. shapes or combinations thereof) than what is shown may also be exhibited by the dielectric material sheet, conductive strips, and/or integrated capacitor-wire segments. Although the conductive strips in the rectangular loop 206 follows a path outlining a rectangular shape in FIG. 4K, the conductive strips in the rectangular loop 206 may also follow a different path outlining a different shape that turns the rectangular loop 206 into a loop with a different shape, such as a polygonal, circular, oval, elliptical, spiral, etc. loop or combinations thereof. Although a specific number of conductive strips and/or integrated capacitor-wire segments in the rectangular loop 206 are shown in FIG. 4K, the power transmitter 250 may also include more integrated capacitor-wire segments, or a lesser number of integrated capacitor-wire segments than what is shown.

Figure 4L:
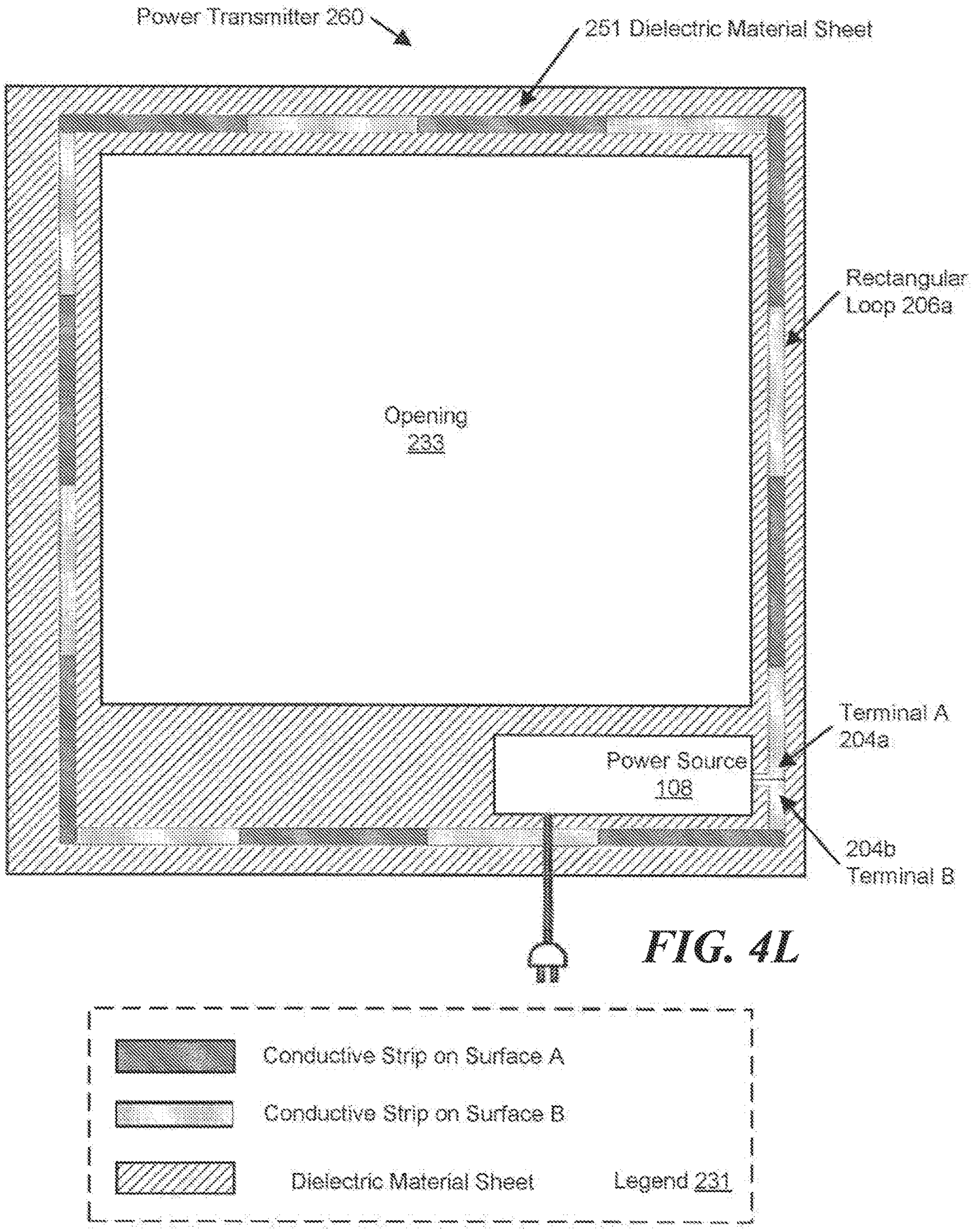

FIG. 4L shows an example construction of the variable form factor transmitter 102 in accordance with one or more embodiments. In one or more embodiments, one or more of the modules and elements shown in FIG. 4L may be omitted, repeated, and/or substituted. Accordingly, embodiments of the disclosure should not be considered limited to the specific arrangements of modules shown in FIG. 4L.

As shown in FIG. 4L, the power transmitter 260, depicted based on the legend 231, shows an example construction corresponding to a top view of the power transmitter 250 depicted in FIG. 4K above. In particular, the top view has a viewing direction along the aforementioned third dimension perpendicular to the surface (e.g., surface A 220*a*, surface B 220*b*) of the power transmitter 250. The power transmitter 260 includes a rectangular loop 206*a* implemented using the dielectric material sheet 251 and connected to the power source 108. The rectangular loop 206*a* and dielectric material sheet 251 are variations of the rectangular loop 206 and dielectric material sheet 225 depicted in FIG. 4K above. For example, the rectangular loop 206*a* and the rectangular loop 206 have different number of capacitor-wire segments. Further, the dielectric material sheet 251 includes an opening 233 where the dielectric material is cut out from the dielectric material sheet 251.

In one or more embodiments, the power source 108 is implemented using at least a flexible circuit having a thin insulating polymer film with conductive circuit patterns and electronic chips affixed thereto. For example, the flexible circuit may be attached to and/or mechanically supported by the dielectric material sheet 251. Example details of a portion of the power transmitter 260 containing the power source 108 is shown in FIG. 4M below based on the legend 241.

Figure 4M:
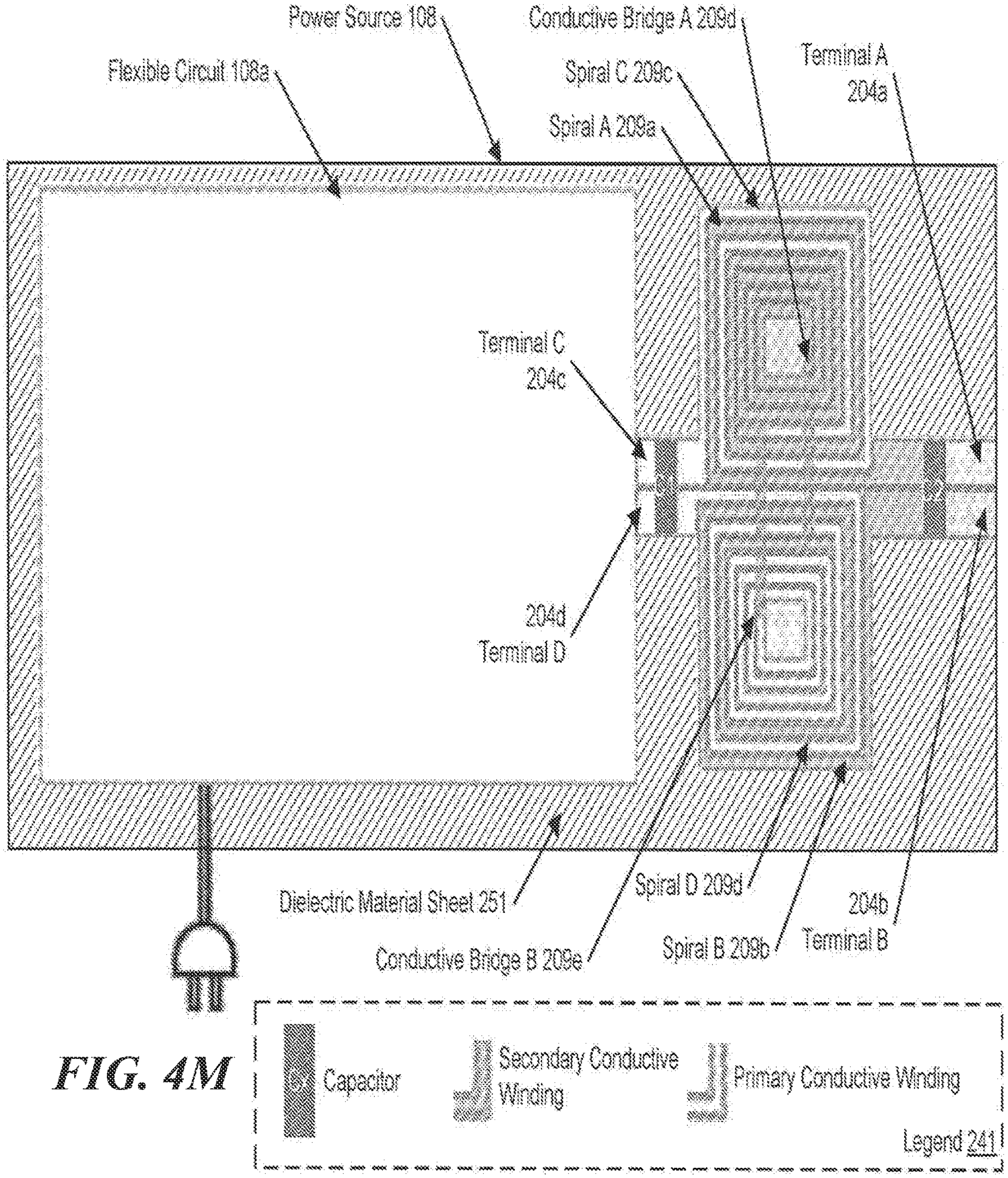

As shown in FIG. 4M, the power source 108 includes a flexible circuit 108*a* connected to several conductive strips attached to a surface of the dielectric material sheet 251. The conductive strips include a spiral A 209*a*, a spiral B 209*b*, a spiral C 209*c*, and a spiral D 209*d*. One end of the spiral A 209*a* is designated as the terminal A 204*a*, one end of the spiral B 209*b* is designated as the terminal B 204*b*, one end of the spiral C 209*c* is designated as the terminal C 204*c*, and one end of the spiral D 209*d* is designated as the terminal D 204*d*. The other ends of the spiral A 209*a* and spiral B 209*b* are connected together using the conductive bridge A 209*d* to implement a secondary winding of an isolation transformer contained in the power source 108. The other ends of the spiral C 209*c* and spiral D 209*d* are connected together using the conductive bridge B 209*e* to implement a primary winding of the isolation transformer. The conductive bridge A 209*d* and conductive bridge B 209*e* may be implemented using insulated conductive wires or other electrical connection means. The primary and secondary windings intertwine with each other to provide an inductance coupling effect of the isolation transformer. In addition, certain capacitors (designated as C1 and C2) contained in the power source 108 may be connected to the terminal A 204*a*, terminal B 204*b*, terminal C 204*c*, and terminal D 204*d*. The capacitors C1 and C2 may be discrete capacitors soldered to the terminals or capacitors implemented using additional conductive strips attached to the two opposing surfaces of the dielectric material sheet 251. For example, the isolation transformer and the capacitors C1 and C2 may be part of or related to an impedance matching circuit to substantially match a predetermined output impedance of the power source 108 to the string of distributed capacitors in the rectangular loop 206*a* depicted in FIG. 4L.

Figure 4N:
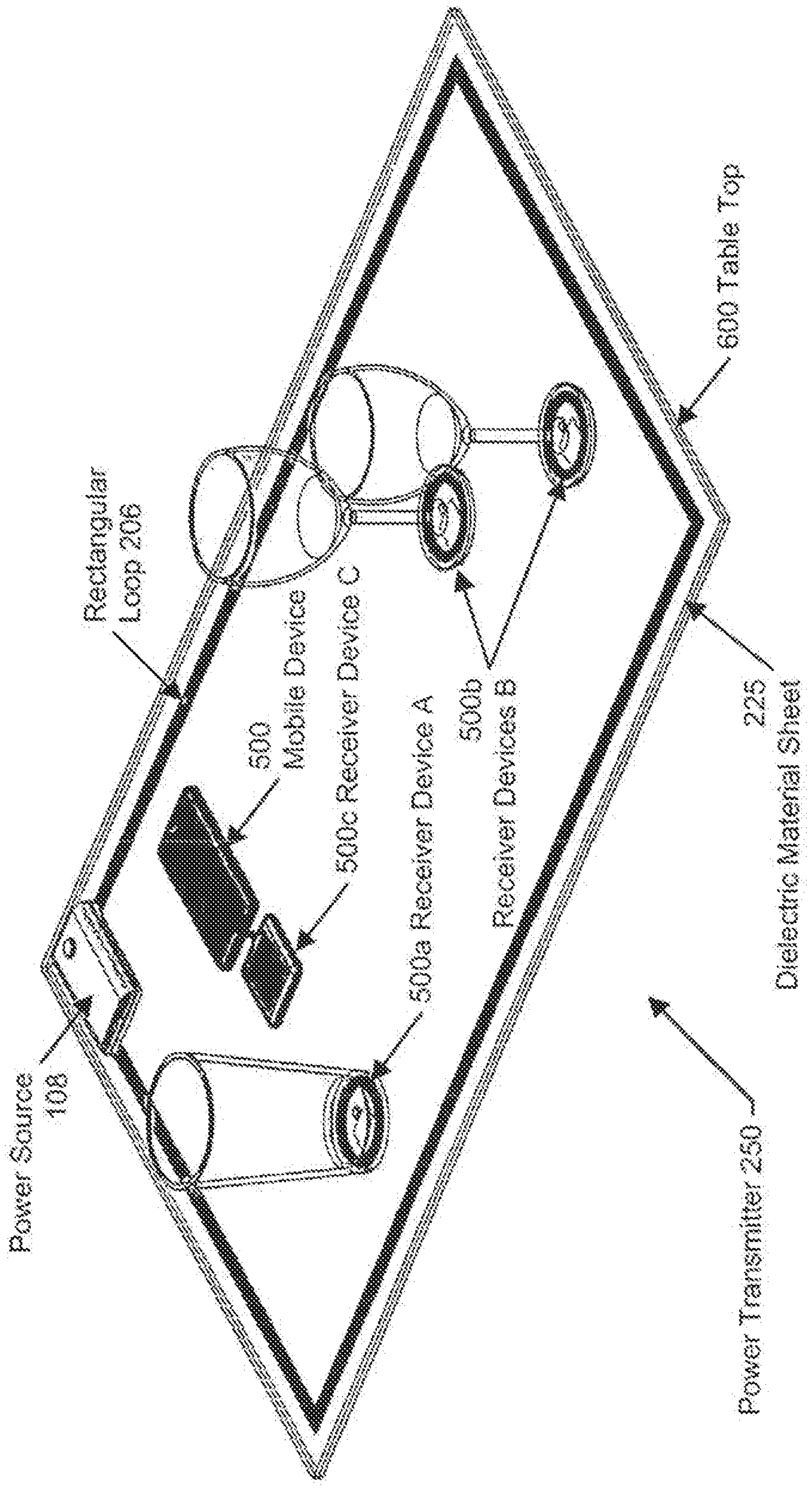

FIG. 4N shows an application example of a wireless power transfer area, based on the power transmitter 250 depicted in FIG. 4K above, in accordance with one or more embodiments. In one or more embodiments, one or more of the modules and elements shown in FIG. 4N may be omitted, repeated, and/or substituted. Accordingly, embodiments of the disclosure should not be considered limited to the specific arrangements of modules shown in FIG. 4N.

As shown in FIG. 4N, the wireless power transfer area includes the tabletop 600 where the rectangular loop 206 of the power transmitter 250 follows the edges of the tabletop 600. The dielectric material sheet 225 is laid on top of the tabletop 600 where the thickness is omitted for clarity. The power cord and plug of the power source 108 are also omitted. The receiver device A 500*a* and receiver devices B 500*b* receive wireless power transfer from the power transmitter 250 to light up a string of decorative light emitting diodes (LEDs) attached to the bottoms of glasses. Examples of the receiver device A 500*a* and receiver devices B 500*b* are described in reference to FIGS. 7A, 7B, 7D, and 7E below. In addition, the receiver device C 500*c* is a commercially available product that receives wireless power transfer from the power transmitter 250 to charge the battery of a mobile device 500, such as a mobile phone, tablet computer, notebook computer, etc. TABLE 3 shows input power and input current for four example loading scenarios of the power transmitter 250.

TABLE 3

| Input Power (W) | Input Current (A) | Number of Load(s) |
|---|---|---|
| 23.23 | 1.96 | 0 |
| 23.80 | 2.01 | 1 LED |
| 24.82 | 2.10 | 2 LED |
| 25.63 | 2.17 | 3 LED |
| 28.38 | 2.17 | 3 LED + Battery Charger |

Figure 4P:
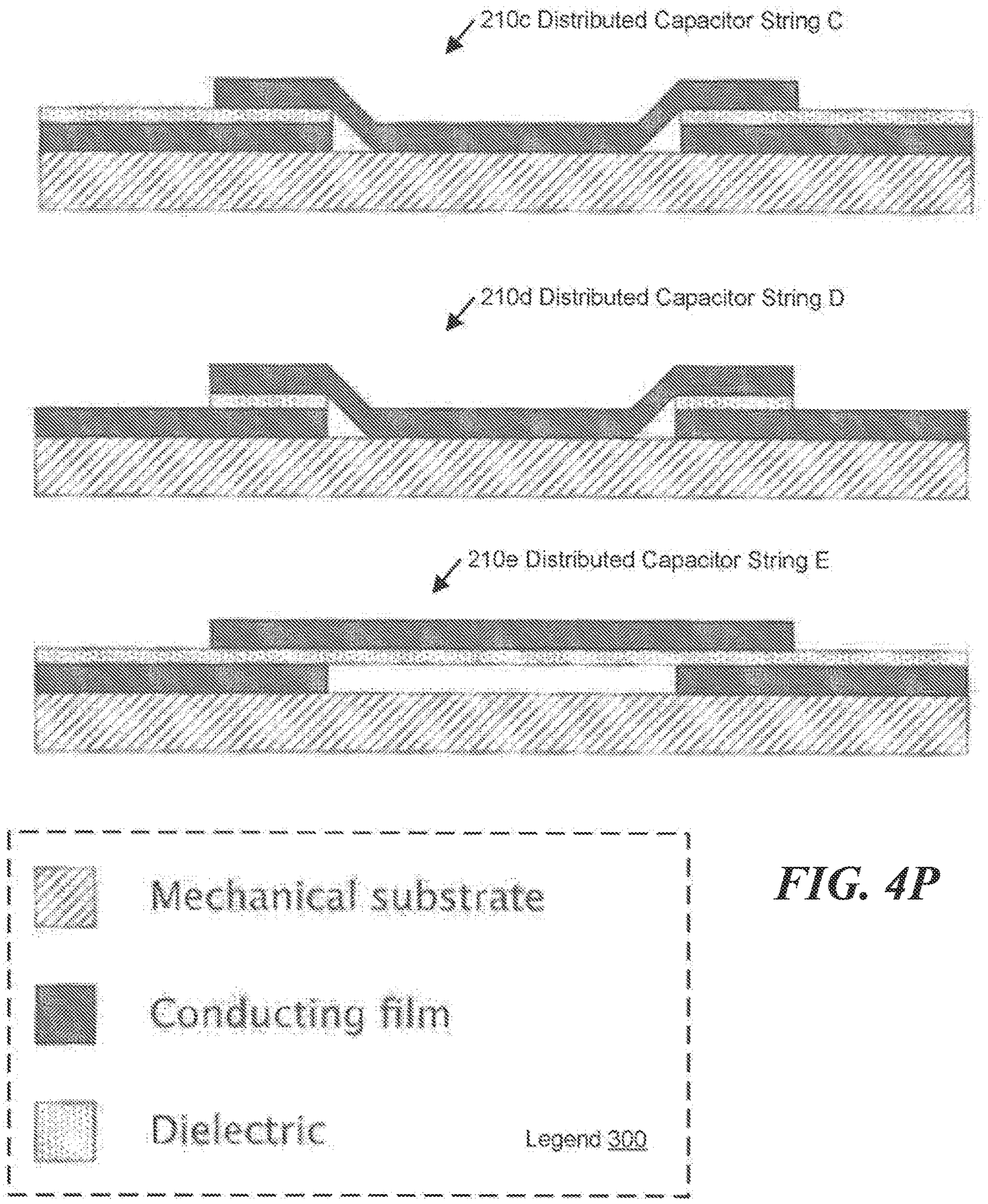

Similar to the distributed capacitor string A 210*a* and distributed capacitor string B 210*b* depicted in FIG. 4J above, FIG. 4P shows additional constructions of the variable form factor transmitter in accordance with one or more embodiments. In particular, overlapping portions of the two conducting films correspond to capacitors while non-overlapping portions of either conducting film correspond to inductors. In one or more embodiments, one or more of the modules and elements shown in FIG. 4P may be omitted, repeated, and/or substituted. Accordingly, embodiments of the disclosure should not be considered limited to the specific arrangements of modules shown in FIG. 4P.

As shown in FIG. 4P, the distributed capacitor string C 210*c*, distributed capacitor string D 210*d*, and distributed capacitor string E 210*e* are three additional example constructions of the variable form factor transmitter 102 depicted in FIGS. 3A and 3B above. According to legend 300, the dielectric is a layer which separates two layers of conducting film. The mechanical support is not provided by the dielectric, but rather by a separate and distinct insulating mechanical substrate that is shown below both the conducting film layers and the dielectric layer. The dielectric may include an oxide layer grown on the surface of one of the layers of conducting film, which may be a metallic conductor. The dielectric layer may cover the entire upper surface of the lower conducting layer, as shown in the distributed capacitor string C 210*c*, or may only cover the region of overlap, as shown in the distributed capacitor string D 210*d*.

Alternatively, as shown in the distributed capacitor string E 210*e*, the dielectric may consist of a thin film of insulating material to which both the upper and lower conducting films adhere. However, the dielectric may be too thin to provide adequate mechanical support, in which case all three layers may be superposed above an additional insulating layer, which provides mechanical support of the dielectric and upper/lower conducting films.

Figure 6A:
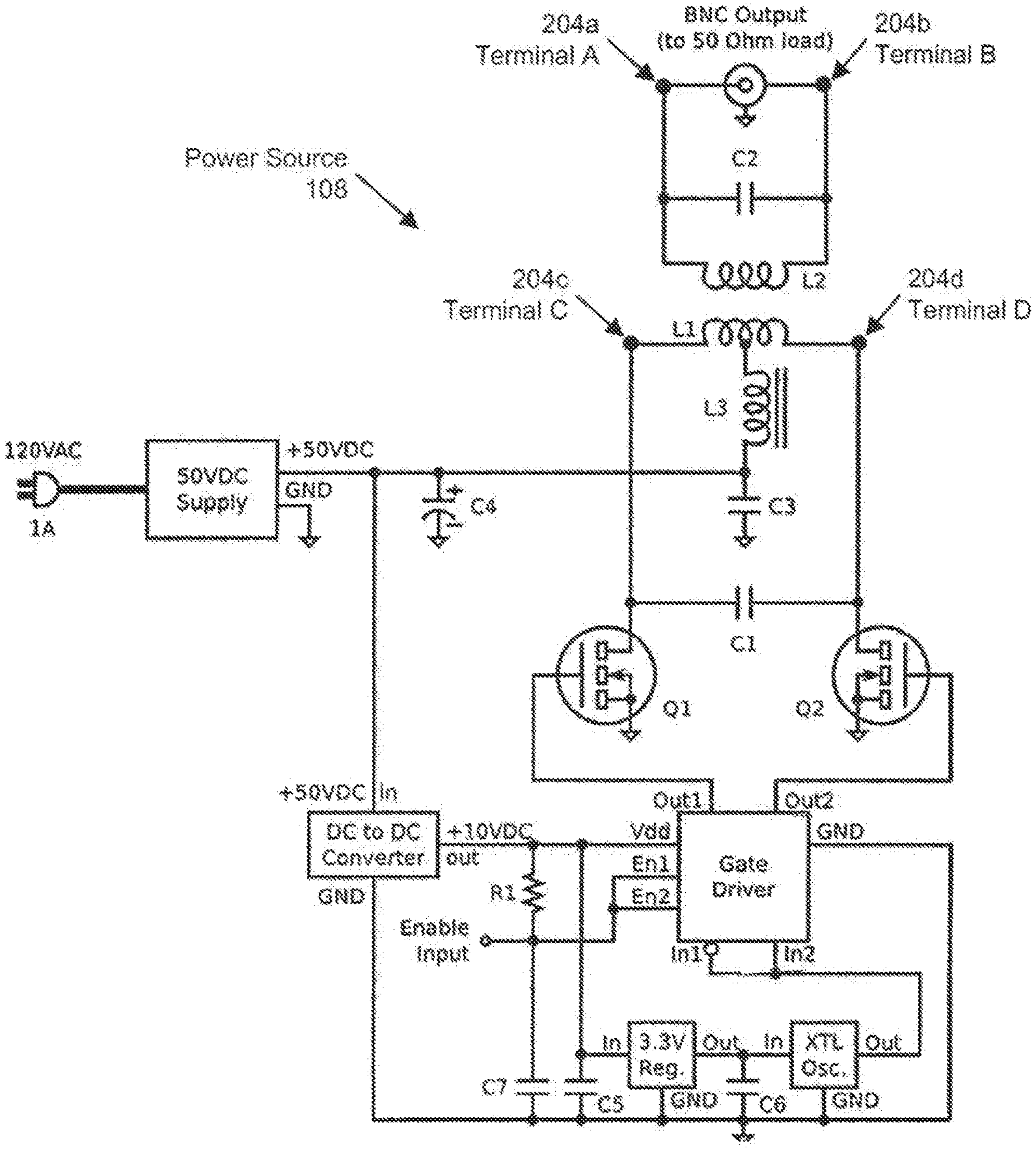
FIGS. 6A and 6B show schematic diagrams of example radio frequency (RF) power sources in accordance with one or more embodiments of the disclosure.

FIG. 6A shows a schematic diagram of an example RF power source in accordance with one or more embodiments of the disclosure. In particular, the example RF power source 108 shown in FIG. 6A may operate based on the ISM band as the power source 108 depicted in FIGS. 3A, 3C, 4B, 4C, 4D, 4K, 4L, and 4M above. Specifically, the example RF power source 108 shown in FIG. 5A includes the terminal A 204*a* and terminal B 204*b* that correspond to the two terminals of the power source 108 depicted in FIGS. 3A, 3C, 4B, 4C, 4D, 4K, 4L, and 4M above. The schematic diagram includes capacitors, inductors, and resistors of various RLC circuit components and commercial part numbers of various integrated circuit components. In particular, the inductors designated as L1 and L2 correspond to the primary conductive winding and secondary conductive winding shown in FIG. 4M above. The capacitors designated as C1 and C2 correspond to like-named capacitors shown in FIG. 4M above. In one or more embodiments, one or more of the modules and elements shown in FIG. 6A may be omitted, repeated, and/or substituted. Accordingly, embodiments of the disclosure should not be considered limited to the specific arrangements of modules shown in FIG. 6A.

Figure 6B:
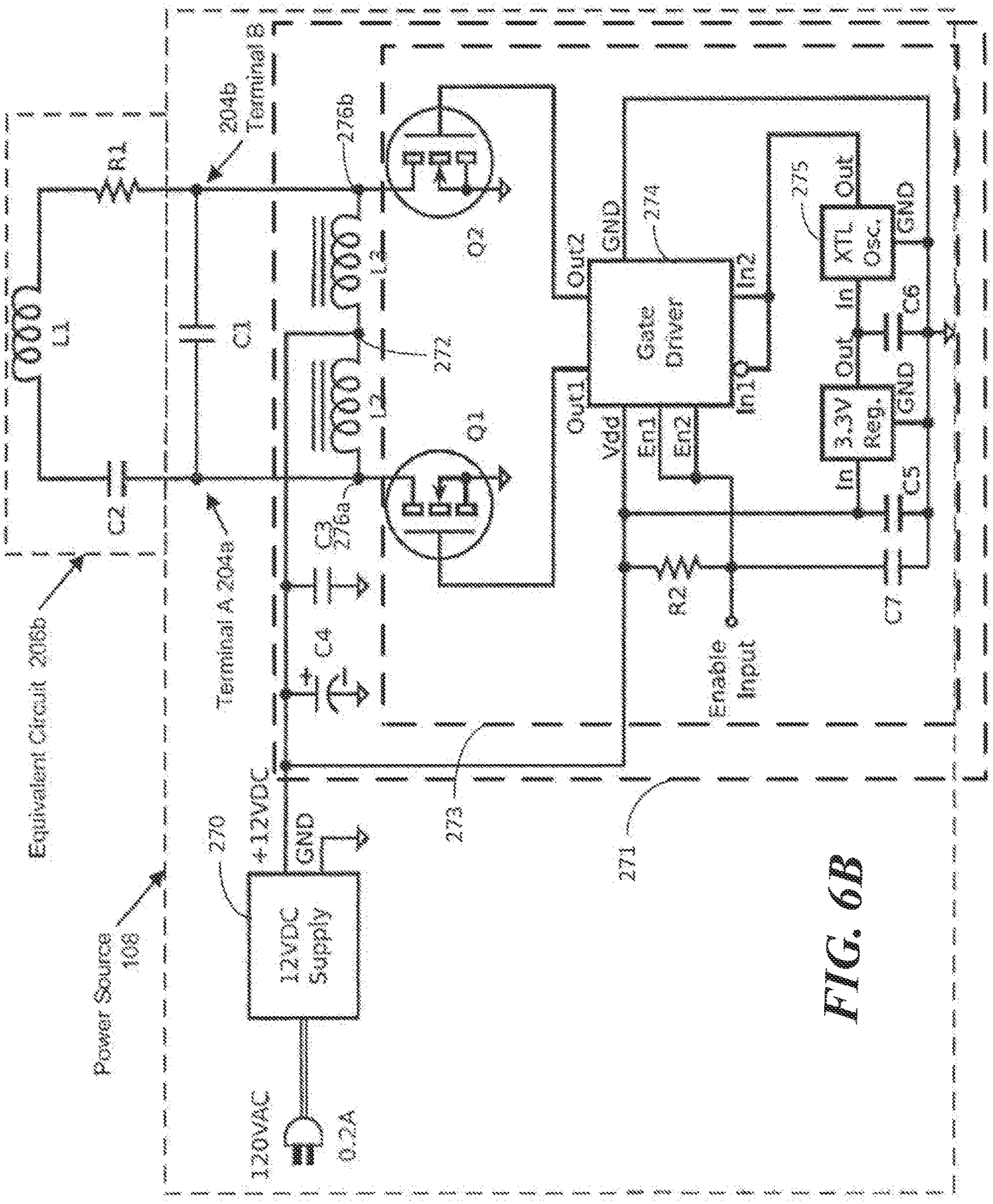

FIG. 6B shows a schematic diagram of an example RF power source connected to an equivalent circuit in accordance with one or more embodiments of the disclosure. In particular, the example RF power source 108 shown in FIG. 6B may operate based on the ISM band as the power source 108 depicted in FIGS. 3A, 3C, 4B, 4C, 4D, 4K, and 4L above. Specifically, the example RF power source 108 shown in FIG. 6B includes the terminal A 204*a* and terminal B 204*b* that correspond to the two terminals of the power source 108 depicted in FIGS. 3A, 3C, 4B, 4C, 4D, 4K, and 4L above. The schematic diagram includes capacitors, inductors, and resistors of various RLC circuit components and commercial part numbers of various integrated circuit components. In particular, the equivalent circuit 206*b* represents the rectangular loop 206 or rectangular loop 206*a* shown in FIGS. 4K and 4L above. In one or more embodiments, one or more of the modules and elements shown in FIG. 6B may be omitted, repeated, and/or substituted. Accordingly, embodiments of the disclosure should not be considered limited to the specific arrangements of modules shown in FIG. 6B.

The theory of operation of the RF power source shown in FIG. 6B will now be described. The equivalent circuit 206*b* is a resonant magnetic loop antenna. This resonant magnetic loop antenna 206*b* comprises a loop of wire which carries an oscillating RF current around the perimeter of a predefined area. The resonant magnetic loop 206*b* represents a wireless power transmitter. This oscillating RF current generates a magnetic field which fills the interior and the near vicinity of the resonant magnetic loop antenna 206*b*. Wireless power receivers placed in the interior or in the near vicinity of the resonant magnetic loop antenna 206*b* can receive power wirelessly from the oscillating magnetic field generated by the loop antenna 206*b*.

The lumped element components, L1, C2, and R1 of the resonant magnetic loop 206*b* are an equivalent electrical circuit which represents the total series inductance, capacitance, and resistance, respectively, of the resonant magnetic loop antenna 206*b*. These lumped element components may not correspond to actual components in the resonant magnetic loop antenna 206*b*. For example, if the resonant magnetic loop antenna 206*b* is physically large, it may be necessary to construct the loop out of multiple segments of wire, joined by capacitors, to prevent the local accumulation of charge due to high voltages. In this case, the capacitor, C2, represents the total series capacitance of all of the capacitors in the loop. Likewise, the inductor, L1, represents the total series inductance of the loop of wire from which the resonant magnetic loop antenna 206*b* is constructed.

The resistor, R1, represents the total series resistance of the resonant magnetic loop antenna. This resistance has two components, one desirable and the other undesirable. The undesirable component of R1 comes from the resistance of the wire which composes the loop, as well as other RF loss mechanisms. Some resistance and loss is unavoidable. Because there is an oscillating RF current flowing through the loop, the equivalent series resistance of the wire plus all other sources of loss will cause a dissipation of heat proportional to this equivalent series resistance. Because this heat performs no useful work, the equivalent series resistance of the wire plus all sources of loss should therefore be made as low as practically possible.

The desirable component of R1 comes from the inductive coupling of the resonant magnetic loop antenna to the wireless power receivers placed in its interior or near vicinity. The mutual inductance between the loop and the receivers allows power to be transferred from the loop to the receivers. This transfer of power can be represented as an equivalent series resistance in the magnetic loop, where the power dissipated in the equivalent series resistance represents this transferred power. Because the power dissipated in this equivalent resistance performs useful work, this resistance does not need to be minimized. However, because this equivalent series resistance is caused by mutual inductance to the loads, it is possible for this equivalent series resistance to vary substantially as the number of loads is changed.

In accordance with a representative embodiment, the RF power source 108 comprises a DC voltage supply 270 and RF power source circuitry 270. The RF power source circuitry 270 includes a first node 270 electrically coupled to the DC voltage supply 270 and push-pull switching circuit 273. The push-pull switching circuit 273 includes a gate driver circuit 274 and a crystal oscillator 275. The first and second terminals 204*a* and 204*b*, respectively, of the resonant magnetic loop antenna 206*b* are electrically coupled to first and second terminals 276*a* and 276*b*, respectively, of the RF power source circuitry 270. The first and second terminals 276*a* and 276*b* also correspond to first and second output terminals, respectively, of the push-pull switching circuit 273.

When the terminals 204*a* and 204*b* of the resonant magnetic loop antenna 206*b* are connected to the terminals 276*a* and 276*b*, respectively, of the RF power source 108, the resonant magnetic loop antenna 206*b* is completed through capacitor C1. The circuit comprising C1, C2, L1, and R1 is a resonant LC circuit tuned to resonate at the same frequency as the crystal oscillator (XTL Osc.) 275.

When the resonant magnetic loop antenna 206*b* is in resonance, a sinusoidal RF current flows around the closed loop comprising components C1, C2, L1, and R1. This sinusoidal RF current causes a sinusoidal RF voltage to appear across capacitor C1.

In accordance with this representative embodiment, two transistors Q1 and Q2 comprising a switching circuit of the push-pull switching circuit 273, which may be, for example, MOSFETs, are driven in switching mode at 50% duty cycle by the gate driver circuit 274. One gate-driver channel is inverted, so the two MOSFETs are driven 180 degrees out of phase. For the first half of the RF cycle, transistor Q1 is turned off, and transistor Q2 is turned on, which causes terminal 204*b* to be grounded through Q2 and to remain at ground potential for the duration of the first half of the RF cycle. The voltage of terminal 204*a* starts at zero at the beginning of the first half of the RF cycle, and follows a positive half-sinusoid during this time interval. At the end of the first half of the RF cycle, the voltage of terminal 204*a* returns to zero.

At this point, the two transistors Q1 and Q2 switch. Transistor Q1 turns on and transistor Q2 turns off, and they remain in these states for the duration of the second half of the RF cycle. Terminal 204*a* is grounded through transistor Q1, and remains at ground potential for the duration of the second half of the RF cycle. The voltage of terminal 204*b* starts at zero at the beginning of the second half of the RF cycle, and follows a positive half-sinusoid during this time interval. At the end of the second half of the RF cycle, the voltage of terminal 204*b* returns to zero.

Terminals 204*a* and 204*b* are connected to the positive DC supply through inductors L2 and L3, which operate as RF chokes. Therefore, the average voltage of each terminal must be equal to the DC supply voltage. The average voltage of each terminal is equal to the time integral of its voltage over the full RF cycle divided by the period of the RF cycle. By performing this integral, it can be shown that the peak voltage of each half-sinusoid waveform must be equal to the DC supply voltage (e.g., 12 volts) multiplied by $\pi$.

Because the peak of the half-sinusoid is equal to the amplitude of the RF voltage across the capacitor, C1, this condition constrains the capacitor C1 to have a sinusoidal voltage waveform of a constant amplitude, where the amplitude is equal to pi times the DC supply voltage. It should be noted that the term "amplitude," as that term is used throughout this discussion of FIG. 6B and in the claims, refers to the peak amplitude of the periodic waveform. It should also be noted that while the waveforms discussed herein as being sinusoidal may not be perfectly sinusoidal due to a variety of factors, such as noise, reflections, component imperfections, etc. Thus, the term "sinusoidal," as that term is used herein is intended to describe periodic waveforms that are substantially sinusoidal in that they have substantially constant periods and peak amplitude values that are substantially constant. The term "constant," as that term is used herein, is intended to mean substantially constant in that there may be minor variations in the peak amplitude values.

Assuming the currents flowing through the drains of the MOSFETs Q1 and Q2 are much smaller than the current flowing through C2, L1, and R1, the RF current through C1 can be approximated as being equal to the RF current flowing through C2, L1, and R1. The RF voltage across capacitor C1 is equal to the RF current flowing through C1 multiplied by the capacitive reactance of C1 at the frequency of the RF oscillation. Therefore, by maintaining a constant RF voltage amplitude across capacitor C1, the RF power source 108 forces an RF current of constant amplitude to flow around the wire loop of the resonant magnetic loop antenna represented by the equivalent circuit 206*b*.

By maintaining a constant RF current in the resonant magnetic loop antenna 206*b*, the RF power source 108 ensures that the oscillating magnetic field generated by this current has a constant amplitude. Note that the conditions which ensure the generation of a magnetic field having a constant amplitude are largely independent of the value of the equivalent resistor, R1. This means that the number of loads coupled to the resonant magnetic loop antenna will not affect the amplitude of the magnetic field generated by the loop.

This behavior is desirable, because the maximum power which a wireless device can receive depends on the magnitude of the ambient oscillating magnetic field. If the addition of a new load to the system caused the magnetic field strength to decrease, then the addition of the new load would cause a decrease in power received by all of the other loads already present in the system. It is desirable for each load to be independent, and to not affect the power received by the other loads. The circuit 108 achieves this effect by maintaining a magnetic field having a constant amplitude regardless of the load condition.

The RF power source 108, in combination with the resonant magnetic loop antenna 206*b*, differs from previously known RF amplifiers by the fact that it provides an RF current having a constant amplitude to the resonant magnetic loop antenna 206*b* regardless of the loading condition placed on that antenna by wireless power receivers. Previously known RF amplifiers are designed to provide a constant average RF power to a fixed load, not an RF current of constant amplitude to a variable load. By maintaining an RF current of constant amplitude in the resonant magnetic loop antenna 206*b*, the circuit shown in FIG. 6B maintains a magnetic field of constant amplitude, which allows each wireless power receiver to receive a constant average power, without being affected by the number or the placement of other receivers in the system.

Figure 7A:
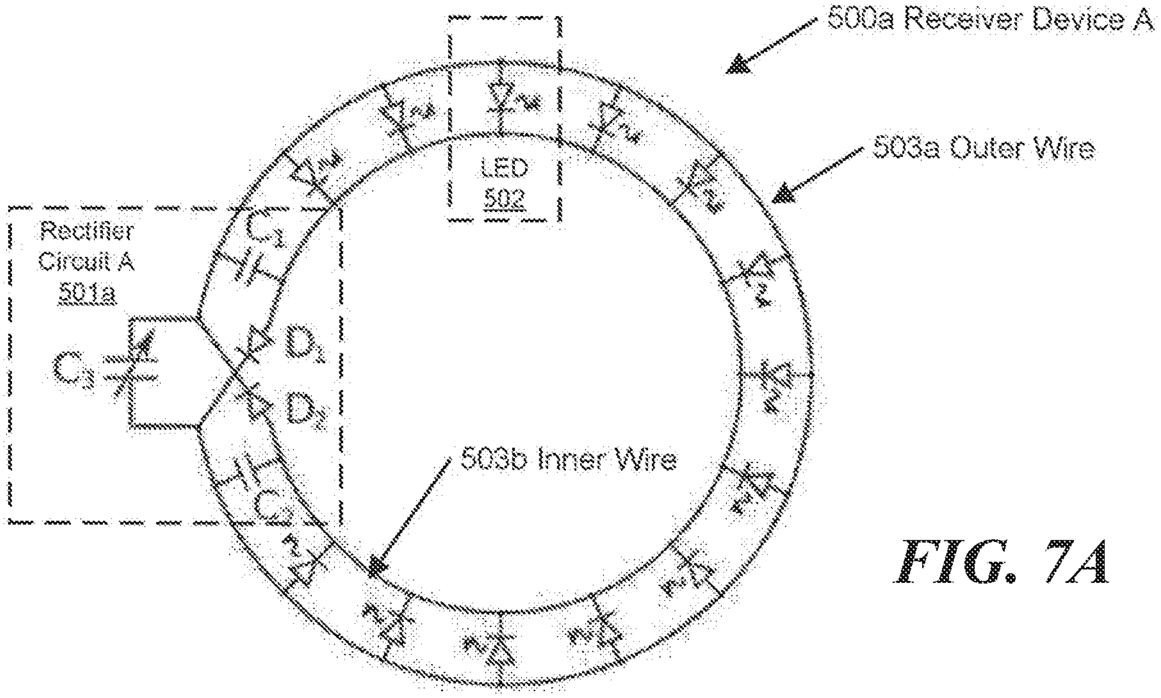
FIGS. 7A, 7B, 7C, 7D, and 7E show schematic and layout diagrams of example receiver devices in accordance with one or more embodiments of the disclosure.

FIG. 7A shows a schematic diagram of an example receiver device A 500*a* in accordance with one or more embodiments of the disclosure. In one or more embodiments, one or more of the modules and elements shown in FIG. 7A may be omitted, repeated, and/or substituted. Accordingly, embodiments of the disclosure should not be considered limited to the specific arrangements of modules shown in FIG. 7A.

As shown in FIG. 7A, the receiver device A 500*a* includes multiple light emitting diodes (LEDs) (e.g., LED 502) that are connected in parallel to form an LED string. The two ends of the LED string are connected to a rectifier circuit A 501*a* to form a loop. For example, the loop may be a circular loop used as a mobile LED lighting device used within the wireless power transfer area 101 depicted in FIG. 3A above. In one or more embodiments of the disclosure, the rectifier circuit A 501*a* includes capacitors C1, C2, and C3 and rectifying diodes D1 and D2. When the receiver device A 500*a* is in the presence of the oscillating magnetic fields, the changing magnetic flux through the loop of the LED string induces a voltage difference between the two ends of the LED string. The induced voltage difference oscillates with time. The capacitance C3 is adjusted to bring the LED string into resonance with the oscillating magnetic fields to enhance the induced oscillating voltage. The rectifying diodes D1 and D2 rectify the induced oscillating voltage to produce a DC voltage difference between the outer wire 503*a* and inner wire 503*b* of the LED string thereby deliver power to the parallel-connected LEDs (e.g., LED 502). The capacitors C1 and C2 act as RF bypass capacitors to maintain the outer wire 503*a* and inner wire 503*b* of the LED string appear shorted to the RF current. The configuration of the receiver device A 500*a* limits the loop voltage by the combined forward voltage drop across the LEDs in series with the rectifying diode D1 or D2, which improves safety to the user.

Figure 7B:
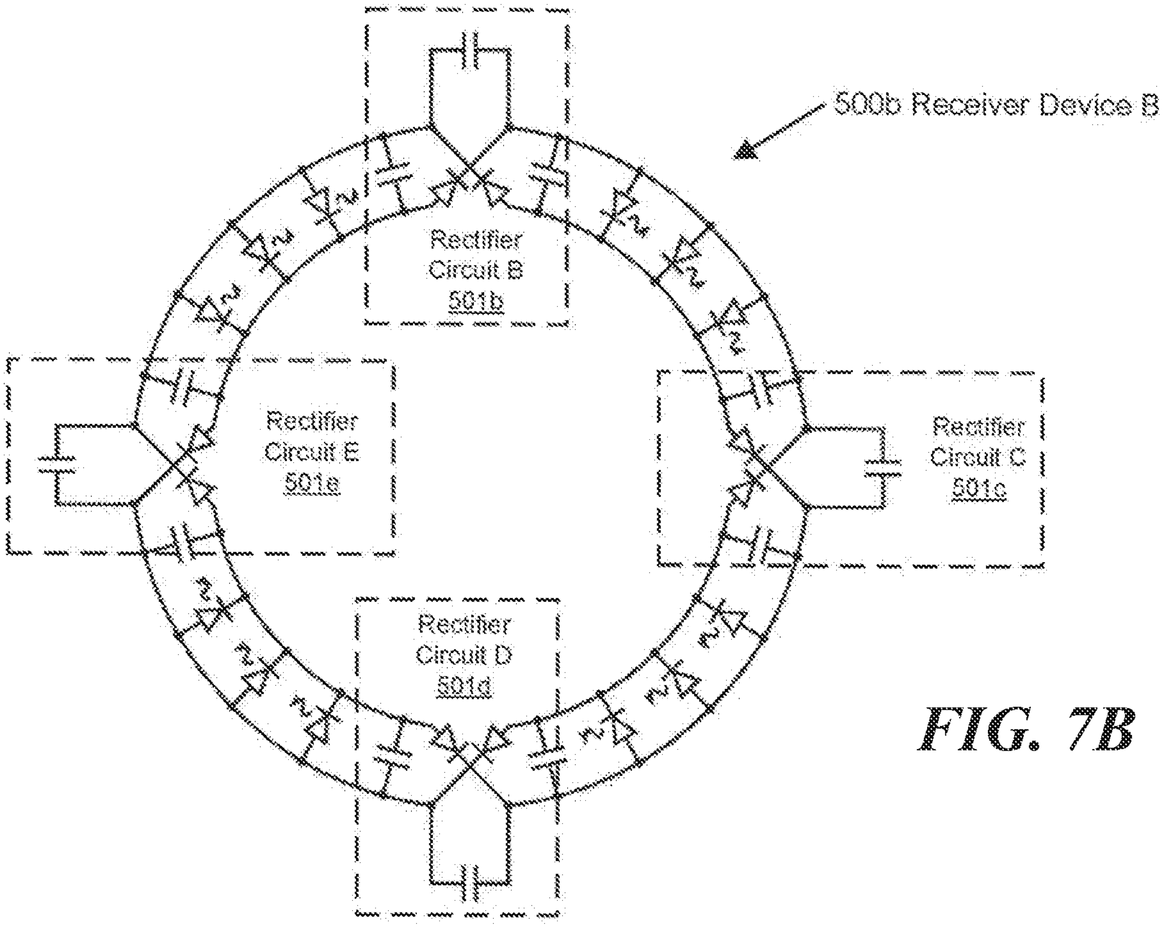

Similar to FIG. 7A, FIG. 7B shows an example receiver device B 500*b*, which is a larger version of the receiver device A 500*a* that has multiple rectifier circuits (i.e., rectifier circuit B 501*b*, rectifier circuit C 501*c*, rectifier circuit D 501*d*, rectifier circuit E 501*e*). The operation of the receiver device B 500*b* is substantially the same as the receiver device A 500*a*. The number of segments in the receiver device B 500*b* may be chosen to provide an optimal impedance match to the load, i.e., the parallel-connected LEDs.

Figure 7C:
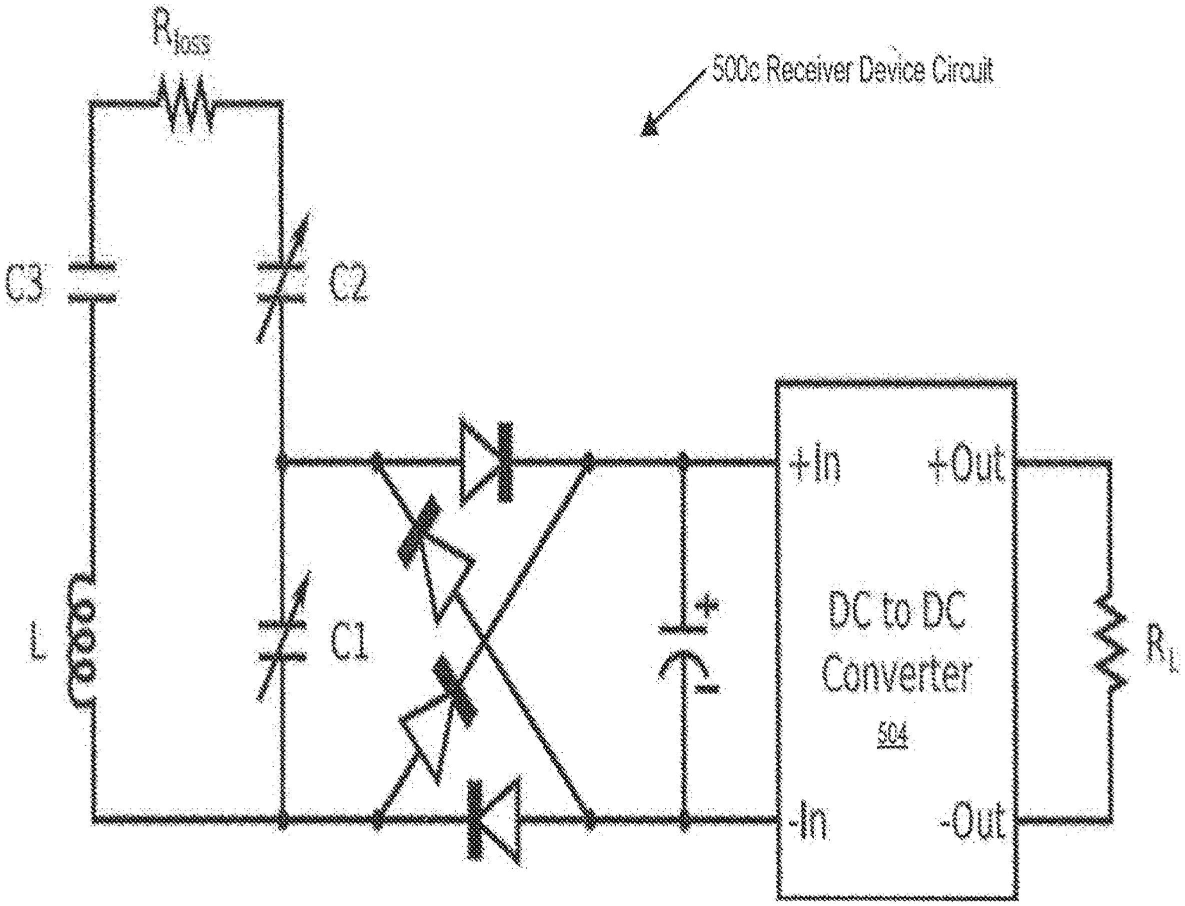

In addition to FIGS. 7A and 7B, FIG. 7C shows a schematic diagram of other example receiver devices.

FIG. 6C shows a schematic diagram of an example receiver device circuit 500*c* in accordance with one or more embodiments of the disclosure. In one or more embodiments, the receiver device circuit 500*c* is employed in various types of receiver devices having different shapes, sizes, form factors, etc. for various different types of mobile or stationery applications within the wireless power transfer area 101 depicted in FIG. 3A above. In one or more embodiments, at least the inductor, L, of the receiver device circuit 500*c* is placed within the wireless power transfer area 101 for receiving the wireless power transfer. The remaining components shown in FIG. 7C are configured to convert the received wireless power to suitable format to be consumed by a load, represented by the resistance, RL.

As shown in FIG. 7C, the inductor, L, along with capacitors, C1, C2, and C3, are tuned to resonate at the characteristic frequency of the variable form factor transmitter 102 and the RF power source 108 described in reference to FIGS. 3A through 4G above. The value of capacitor C1 is chosen to provide an impedance match between the resonant receiver and the input of the DC-to-DC converter 504. The DC-to-DC converter 504 transforms the rectified voltage into a constant voltage to drive the load, RL. The DC-to-DC converter 504 allows the receiver device circuit 500*c* to present a constant voltage to the load RL even in situations where the receiver device circuit 500*c* is moved through regions of varying magnetic field strength within the wireless power transfer area 101. Note that the load RL need not be a linear device, i.e., a device with a linear voltage versus current relation. Examples of load RL include, but are not limited to, LEDs, microcontrollers, motors, sensors, actuators, etc.

Figure 7D:
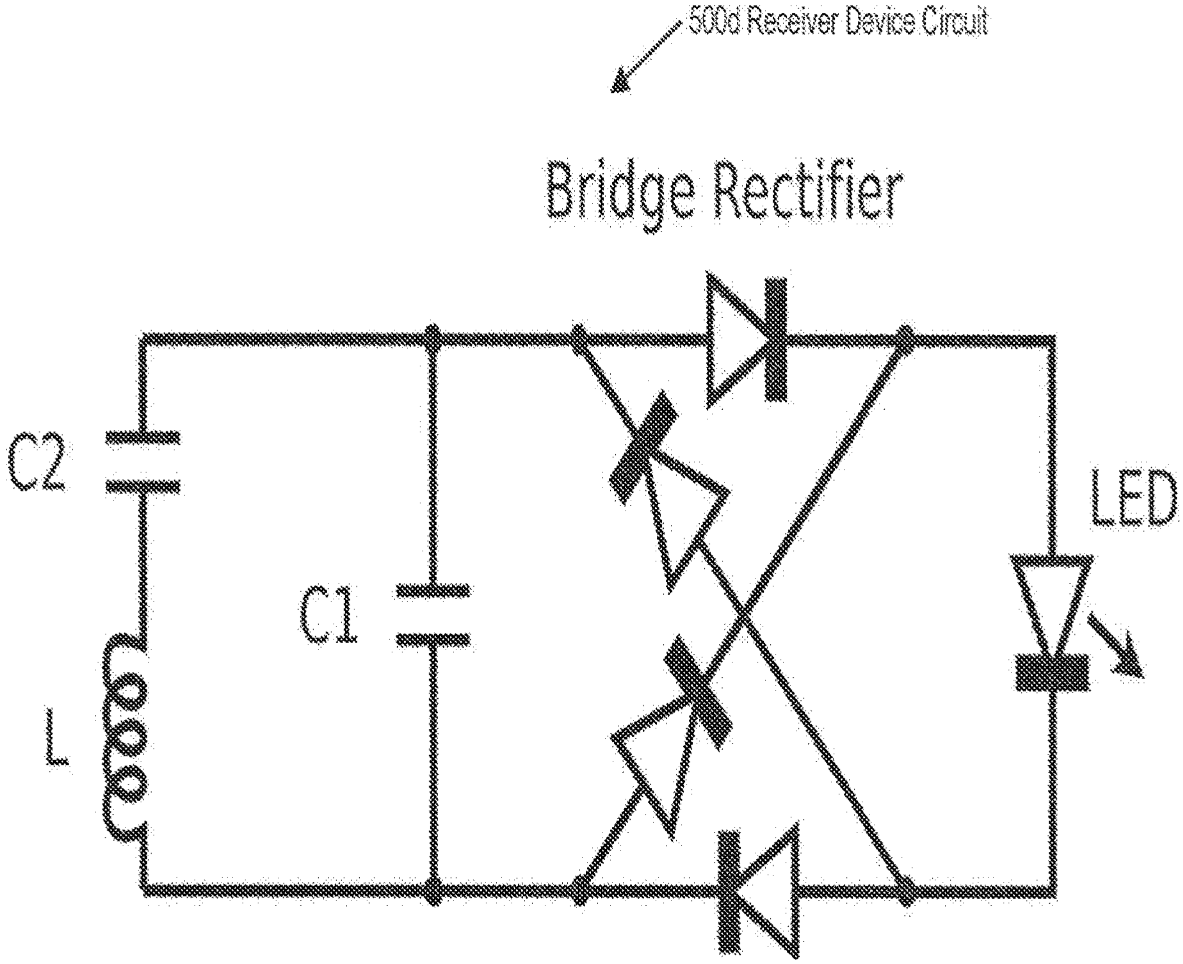

FIG. 7D shows a schematic diagram of an additional example receiver device circuit 500*d* in accordance with one or more embodiments of the disclosure. The inductor, L, along with capacitors, C1 and C2, are tuned to resonate at the characteristic frequency of the variable form factor transmitter 102 and the RF power source 108 described in reference to FIGS. 3A through 4G above. The value of capacitor C1 is chosen to provide an impedance match between the resonant receiver and the LED load. The bridge rectifier converts the RF voltage present on capacitor C1 into a DC voltage, which drives the LED. For example, the LED may correspond to the string of decorative light emitting diodes (LEDs) attached to the bottoms of glasses, depicted in FIG. 4N above.

Figure 7E:
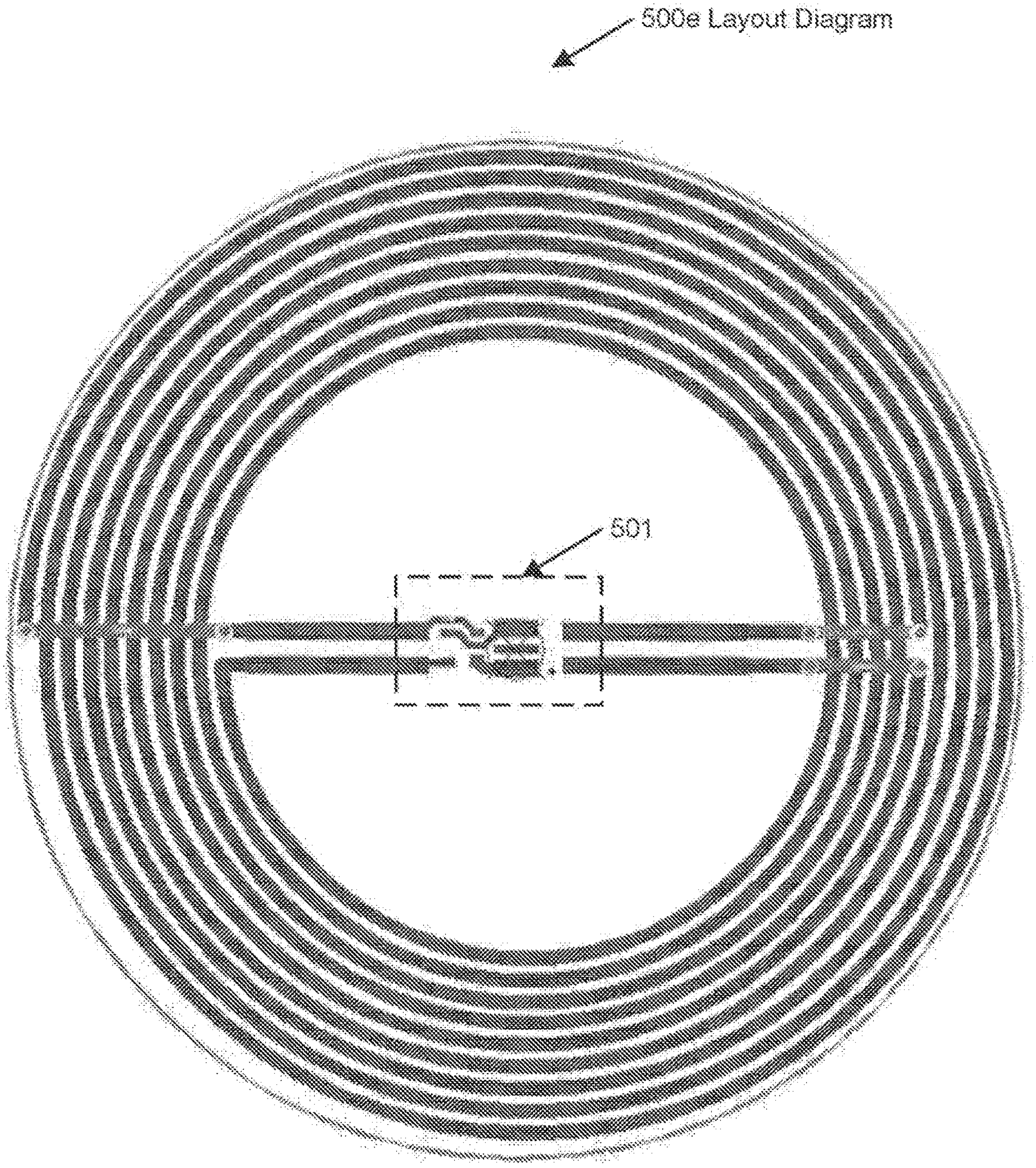

FIG. 7E shows a layout diagram 500*e* of the example receiver device circuit 500*d* depicted in FIG. 7D above. The inductor, L, is composed of a conducting trace on the surface of a printed circuit board (PCB) in the form of a flat spiral with multiple turns. Capacitors, C1 and C2, are placed in series with this spiral at the location 501. A second layer of traces is used on the PCB to allow connections to jump over multiple turns of the inductor, L. Note also that C1 and C2 can be placed in series with the turns of the inductor, L, at any point. In FIG. 7E, for example, the capacitor, C2, is placed across a break in the center of the inductor, L. This placement helps to maintain symmetry in the distribution of voltage on the turns of the inductor, L.

In one or more embodiments of the disclosure, the receiver device A 500*a*, receiver device B 500*b*, receiver device circuit 500*c*, or receiver device circuit 500*d* may receive power wirelessly from any electromagnetic transmitter, such as a dipole transmitter (e.g., magnetic dipole transmitter), a loop antenna with distributed capacitance, a parallel-wire transmission line with distributed capacitance, a shielded transmission line with distributed capacitance, etc. In one or more embodiments of the disclosure, the receiver device A 500*a*, receiver device B 500*b*, receiver device circuit 500*c*, and/or receiver device circuit 500*d* are placed within the wireless power transfer area 101 as the receiver device (A), receiver device (B), receiver device (C), receiver device (D), receiver device (E), or receiver device (F) to receive power wirelessly from the variable form factor transmitter 102.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Clause 1. An accessory for an electronic device, comprising: a wireless power receiver configured to receive power when the accessory is positioned in a first wireless power transfer area; and a wireless power transmitter electrically coupled to the wireless power receiver, the wireless power transmitter being configured to power the electronic device through a second wireless power transfer area, the second wireless power transfer area being smaller than the first wireless power transfer area.

Clause 2. The accessory for the electronic device of clause 1, wherein: the wireless power transmitter positioned within the housing is a first wireless power transmitter; and the wireless power receiver is configured to receive power from a second wireless power transmitter external to the case, the second wireless power transmitter powered by a radiofrequency (RF) power source to transmit power across a wireless power transfer area.

Clause 3. The accessory for the electronic device of any of clauses 1-2, wherein the first wireless power transmitter is a QI standard-compliant wireless power transmitter.

Clause 4. The accessory for the electronic device of any of clauses 1-3, wherein the accessory is a protective case and the electronic device is a portable electronic device comprising at least one battery that powers the portable electronic device.

Clause 5. The accessory for the electronic device of any of clauses 1-4, wherein the electronic device is a portable electronic device that does not comprise a battery, the wireless power transmitter providing power directly to processing circuitry of the portable electronic device.

Clause 6. The accessory for the electronic device of any of clauses 1-5, further comprising a battery independent of that of the electronic device, and the wireless power transmitter is further configured to power the electronic device through the battery.

Clause 7. The accessory for the electronic device of any of clauses 1-6, wherein the electronic device is one of: a mobile phone; a laptop computing device; a tablet computing device; a smart watch computing device, a lighting device, and a sensor.

Clause 8. The accessory for the electronic device of any of clauses 1-7, further comprising a housing configured to detachably attach to the electronic device through at least one of: an interference fit; a friction fit; a connection fit, and an adhesive connection, wherein the wireless power receiver and the wireless power transmitter are disposed between a first surface of the housing and a second surface of the housing.

Clause 9. The accessory for the electronic device of any of clauses 1-8, further comprising processing circuitry configured to convert the power received wirelessly by the wireless power receiver from an alternating current (AC) signal to a direct current (DC) signal and provide the wireless power transmitter with the DC signal.

Clause 10. The accessory for the electronic device of any of clauses 1-9, wherein the wireless power receiver comprises: a receiving coil circuit, comprising: a diode string formed by an outer wire, an inner wire, and a plurality of diodes, each of the plurality of diodes having a first end coupled to the outer wire and a second end coupled to the inner wire such that each of the diodes are connected in parallel with one another, the diode string forming a circular loop; and a rectifier circuit coupled to ends of the diode string, the rectifier circuit comprising: a plurality of capacitors, wherein at least one of the capacitors is configured to bring the diode string into resonance with the oscillating magnetic field and enhance an induced oscillating voltage; and a plurality of rectifying diodes that rectify the induced oscillating voltage to produce a DC voltage difference between the outer wire and the inner wire of the diode string, thereby powering the diodes connected in parallel.

Clause 11. The accessory for the electronic device of any of clauses 1-10, further comprising at least one magnet disposed in the case for coupling the case to the electronic device or to an external charging device.

Clause 12. The accessory for the electronic device of any of clauses 1-12, wherein the at least one magnet is a paramagnetic magnet or a ferromagnetic magnet.

Clause 13. A method, comprising: providing an accessory for an electronic device, the accessory comprising: a wireless power receiver configured to receive power when the accessory is positioned in a first wireless power transfer area; and a wireless power transmitter electrically coupled to the wireless power receiver, the wireless power transmitter being configured to power the electronic device through a second wireless power transfer area; positioning the accessory within the first wireless power transfer area such that the wireless power receiver receives power at the accessory; and generating, by the wireless power transmitter, the second wireless power transfer area such that the second wireless power transfer area provides power to the electronic device, the second wireless power transfer area being smaller than the first wireless power transfer area.

Clause 14. A method, comprising: providing a case for an electronic device, the case comprising a wireless power receiver and a wireless power transmitter; receiving power by the wireless power receiver while the case for the electronic device is in a first wireless power transfer area; and powering the electronic device through a second wireless power transfer area using a wireless power transmitter electrically coupled to the wireless power receiver.

Clauses 15-19. The method of clause 14, wherein: the wireless power transmitter positioned within the housing is a first wireless power transmitter; and receiving the power by the wireless power receiver comprises receiving power from a second wireless power transmitter external to the case, the second wireless power transmitter receives power from a radiofrequency (RF) power source to transmit power across a wireless power transfer area; the first wireless power transmitter is a QI standard-compliant wireless power transmitter; the electronic device is a portable electronic device comprising at least one battery that powers the portable electronic device; the first wireless power transfer area is a greater area relative to the second wireless power transfer area; and/or the electronic device is one of: a mobile phone; a laptop computing device; a tablet computing device; a smart watch computing device, a lighting device, and a sensor.

Clause 20. The method of any of clauses 14-19, wherein the case further comprises a housing configured to detachably attach to the electronic device through at least one of: an interference fit; a friction fit; and a connection fit, wherein the wireless power receiver and the wireless power transmitter are disposed between a first surface of the housing and a second surface of the housing.

Clause 21. The method of any of clauses 14-20, further comprising converting the power received wirelessly by the wireless power receiver from an alternating current (AC) signal to a direct current (DC) signal and providing the wireless power transmitter with the DC signal.

Clause 22. The method of any of clauses 14-22, wherein the wireless power receiver comprises: a receiving coil circuit, comprising: a diode string formed by an outer wire, an inner wire, and a plurality of diodes, each of the plurality of diodes having a first end coupled to the outer wire and a second end coupled to the inner wire such that each of the diodes are connected in parallel with one another, the diode string forming a circular loop; and a rectifier circuit coupled to ends of the diode string, the rectifier circuit comprising: a plurality of capacitors, wherein at least one of the capacitors is configured to bring the diode string into resonance with the oscillating magnetic field and enhance an induced oscillating voltage; and a plurality of rectifying diodes that rectify the induced oscillating voltage to produce a DC voltage difference between the outer wire and the inner wire of the diode string, thereby powering the diodes connected in parallel.

Clause 23. An accessory for an electronic device, comprising a wireless power receiver and a wireless power transmitter electrically coupled to the wireless power receiver.

Clause 24. An accessory for use with an electronic device, comprising: a wireless power receiver configured to receive power while the case for the electronic device is in a first wireless power transfer area; and a wireless power transmitter electrically coupled to the wireless power receiver, the wireless power transmitter being configured to power the electronic device through a second wireless power transfer area being smaller than the first wireless power transfer area.

Clause 25. The accessory for use with the electronic device of clause 24, wherein the accessory is a case or a mount configured to detachably attach to the electronic device.

Clause 26. The accessory for use with the electronic device of any of clauses 24-25, wherein the accessory is a stationary mount or a stationary charging station for use with the electronic device.

Clause 27. The accessory for use with the electronic device of any of clauses 24-26, wherein the accessory further comprises a battery and the wireless power transmitter is further configured to power the electronic device through the battery.

Therefore, the following is claimed:

1. A system, comprising:

a second wireless power transmitter electrically coupled to a conductive loop that defines a large-area wireless power transfer area, wherein;

an accessory for an electronic device, comprising:

a housing, comprising wireless power processing circuitry, configured to detachably attach to the electronic device;

a first wireless power transmitter positioned in the housing; and a wireless power receiver positioned in the housing configured to receive power when the accessory is positioned in the large-area wireless power transfer area;

wherein the wireless power receiver comprises a resonant receiver and a direct current (DC)-to-DC converter, a value of a capacitor of the resonant receiver provides an impedance match between the resonant receiver and the DC-to-DC converter, the first wireless power transmitter is electrically coupled to the wireless power receiver via the wireless power processing circuitry, the first wireless power transmitter is configured to power the electronic device through a second wireless power transfer area, and the second wireless power transfer area is smaller than the large-area wireless power transfer area.

2. The system of claim 1, wherein:

the second wireless power transmitter is configured to be powered by a radiofrequency (RF) power source to transmit power across the large-area wireless power transfer area when the accessory is multiple feet away from the second wireless power transmitter.

3. The system of claim 2, wherein the first wireless power transmitter is a QI standard-compliant wireless power transmitter.

4. The system of claim 1, further comprising the electronic device, wherein the accessory is a protective case comprising the housing that is configured to detachably attach to the electronic device, and the electronic device is portable and comprises at least one battery that powers the electronic device.

5. The system of claim 1, further comprising a battery independent of that of the electronic device, and the wireless power transmitter is further configured to power the electronic device through the battery.

6. The system of claim 1, wherein the electronic device is one of: a mobile phone; a laptop computing device; a tablet computing device; a smart watch computing device, a lighting device, and a sensor.

7. The system of claim 1, wherein the housing is configured to detachably attach to the electronic device through at least one of: an interference fit; a friction fit; a connection fit, and an adhesive connection, wherein the wireless power receiver and the first wireless power transmitter are disposed between a first surface of the housing and a second surface of the housing.

8. The system of claim 1, wherein the resonant receiver of the wireless power receiver comprises a rectifier configured to convert the power received wirelessly by the wireless power receiver from an alternating current (AC) signal to a direct current (DC) signal and provide the DC signal to the DC-to-DC converter.

9. The system of claim 1, wherein the accessory is a protective case, and the protective case further comprising at least one magnet disposed therein for coupling the protective case to the electronic device or to an external charging device.

10. The system of claim 9, wherein the at least one magnet is a paramagnetic magnet or a ferromagnetic magnet.

11. A method, comprising:

providing an accessory for an electronic device, the accessory comprising:

a housing, comprising wireless power processing circuitry, configured to detachably attach to the electronic device;

a first wireless power transmitter; and a wireless power receiver configured to receive power when the accessory is positioned in a first wireless power transfer area, the first wireless power transfer area being a large-area wireless power transfer area defined by a conductive loop and a second wireless power transmitter electrically coupled to the conductive loop that is external to the accessory;

wherein the first wireless power transmitter is electrically coupled to the wireless power receiver via the wireless power processing circuitry, the first wireless power transmitter is configured to power the electronic device through a second wireless power transfer area;

positioning the accessory within the first wireless power transfer area such that the wireless power receiver receives power at the accessory from the conductive loop and the second wireless power transmitter;

wherein the wireless power receiver comprises a resonant receiver including a rectifier to convert the power received wirelessly to a direct current (DC) signal and a DC-to-DC converter to output a constant voltage to the electronic device; and generating, by the wireless power transmitter, the second wireless power transfer area such that the second wireless power transfer area provides power to the electronic device, the second wireless power transfer area being smaller than the first wireless power transfer area.

12. An accessory for an electronic device, comprising:

a wireless power receiver configured to receive power when the accessory is positioned in a first wireless power transfer area; and a wireless power transmitter electrically coupled to the wireless power receiver, the wireless power transmitter being configured to power the electronic device through a second wireless power transfer area, the second wireless power transfer area being smaller than the first wireless power transfer area, wherein the wireless power receiver comprises: a receiving coil circuit, comprising: a diode string formed by an outer wire, an inner wire, and a plurality of diodes, each of the plurality of diodes having a first end coupled to the outer wire and a second end coupled to the inner wire such that each of the diodes are connected in parallel with one another, the diode string forming a circular loop; and a rectifier circuit coupled to ends of the diode string, the rectifier circuit comprising: a plurality of capacitors, wherein at least one of the capacitors is configured to bring the diode string into resonance with an oscillating magnetic field and enhance an induced oscillating voltage; and a plurality of rectifying diodes that rectify the induced oscillating voltage to produce a DC voltage difference between the outer wire and the inner wire of the diode string, thereby powering the diodes connected in parallel.

13. The accessory for the electronic device of claim 12, wherein:

the accessory comprises a housing;

the wireless power transmitter positioned within the housing is a first wireless power transmitter; and the wireless power receiver is configured to receive power from a second wireless power transmitter external to the housing, the second wireless power transmitter powered by a radiofrequency (RF) power source to transmit power across the first wireless power transfer area.

14. The accessory for the electronic device of claim 13, wherein the first wireless power transmitter is a QI standard-compliant wireless power transmitter.

15. The accessory for the electronic device of claim 12, wherein the accessory is a protective case comprising a housing that is configured to detachably attach to the electronic device, and the electronic device is a portable electronic device comprising at least one battery that powers the portable electronic device.

16. The accessory for the electronic device of claim 12, wherein the electronic device is a portable electronic device that does not comprise a battery, the wireless power transmitter providing power directly to processing circuitry of the portable electronic device.

17. The accessory for the electronic device of claim 12, further comprising a battery independent of that of the electronic device, and the wireless power transmitter is further configured to power the electronic device through the battery.

18. The accessory for the electronic device of claim 12, further comprising processing circuitry configured to convert the power received wirelessly by the wireless power receiver from an alternating current (AC) signal to a direct current (DC) signal and provide the wireless power transmitter with the DC signal.

* * * * *